United States Patent
Watanabe

(10) Patent No.: US 9,624,774 B2
(45) Date of Patent: *Apr. 18, 2017

(54) ENGINE CONTROL APPARATUS

(75) Inventor: Satoru Watanabe, Susono-shi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 354 days.

This patent is subject to a terminal disclaimer.

(21) Appl. No.: 14/347,025

(22) PCT Filed: Sep. 28, 2011

(86) PCT No.: PCT/JP2011/072216
§ 371 (c)(1),
(2), (4) Date: Dec. 6, 2014

(87) PCT Pub. No.: WO2013/046363
PCT Pub. Date: Apr. 4, 2013

(65) Prior Publication Data
US 2015/0081101 A1    Mar. 19, 2015

(51) Int. Cl.
*B60T 7/12* (2006.01)
*F01B 25/00* (2006.01)
(Continued)

(52) U.S. Cl.
CPC .......... *F01B 25/00* (2013.01); *F02D 41/2416* (2013.01); *F02D 41/2422* (2013.01);
(Continued)

(58) Field of Classification Search
CPC ... B60W 20/00; F02D 41/2451; F02D 41/266
(Continued)

(56) References Cited

U.S. PATENT DOCUMENTS

| 4,729,358 A | 3/1988 | Morita et al. |
| 5,649,198 A | 7/1997 | Shibata et al. |

(Continued)

FOREIGN PATENT DOCUMENTS

| EP | 2 341 448 A1 | 7/2011 |
| JP | 62-240441 A | 10/1987 |

(Continued)

OTHER PUBLICATIONS

Takeshi Horie et al., "All-to-All Personalized Communication on a Wraparound Mesh," Parallel Computing Research Center, Fujitsu Laboratories Ltd., Apr. 1993, pp. 628-637, vol. 34, No. 4.

(Continued)

*Primary Examiner* — John Kwon
(74) *Attorney, Agent, or Firm* — Finnegan, Henderson, Farabow, Garrett & Dunner, LLP

(57) ABSTRACT

It is a task of the invention to make it possible to calculate a control target value of one actuator or control target values of a plurality of actuators regarding engine control at a high speed through the use of a multicore processor. With a view to accomplishing this task, a plurality of lattice points that are arranged on a two-dimensional orthogonal coordinate system having axes representing a first operating condition and a second operating condition respectively are associated respectively with at least one or some of a plurality of cores that are arranged in a latticed manner on the multicore processor on one-on-one level on a same line as on the two-dimensional orthogonal coordinate system, and a calculation program for calculating an optimal control value at the associated lattice point or calculation programs for calculating optimal control values at the associated lattice points are allocated respectively to at least one or some of the plurality of the cores. In addition, each of the cores with which the lattice points are associated respectively is pro- (Continued)

grammed, in a case where an operation area on the two-dimensional orthogonal coordinate system to which a current operating point belongs is an area that is defined by the lattice point associated with each of the cores itself, to transmit, to an interpolation calculation core, an optimal control value at the relevant lattice point that is calculated by each of the cores itself. The interpolation calculation core is programmed to perform an interpolation calculation of an optimal control value at the current operating point using optimal control values at all the lattice points that define the operation area on the two-dimensional orthogonal coordinate system to which the current operating point belongs. In addition, the multicore processor outputs the optimal control value at the current operating point, which is obtained from the interpolation calculation core, as a control target value of each of the actuators.

16 Claims, 11 Drawing Sheets

(51) Int. Cl.
*F02D 41/24* (2006.01)
*F02D 41/26* (2006.01)
*G05B 15/02* (2006.01)
*F02D 41/06* (2006.01)

(52) U.S. Cl.
CPC ........... *F02D 41/266* (2013.01); *G05B 15/02* (2013.01); *F02D 41/068* (2013.01); *F02D 2200/021* (2013.01); *F02D 2200/0414* (2013.01); *F02D 2200/501* (2013.01)

(58) Field of Classification Search
USPC ..................... 701/101, 102, 106, 114, 115
See application file for complete search history.

(56) References Cited

U.S. PATENT DOCUMENTS

| | | | |
|---|---|---|---|
| 6,082,334 | A | 7/2000 | Shomura et al. |
| 6,304,671 | B1 | 10/2001 | Kakutani |
| 8,738,860 | B1 | 5/2014 | Griffin et al. |
| 2011/0083125 | A1 | 4/2011 | Komatsu et al. |
| 2011/0213946 | A1 | 9/2011 | Ajima et al. |
| 2012/0216017 | A1 | 8/2012 | Inada |
| 2012/1026542 | | 10/2012 | Livshiz et al. |
| 2014/0343823 | A1* | 11/2014 | Watanabe ........... F02D 41/2416 701/102 |
| 2015/0081101 | A1* | 3/2015 | Watanabe ........... F02D 41/2416 700/275 |

FOREIGN PATENT DOCUMENTS

| | | |
|---|---|---|
| JP | 09-198358 A | 7/1997 |
| JP | 11-191848 A | 7/1999 |
| JP | 11-280519 A | 10/1999 |
| JP | 2008-197776 A | 8/2008 |
| JP | 2008-269487 | 11/2008 |
| JP | 2011-053876 A | 3/2011 |
| JP | 2011-81539 | 4/2011 |

OTHER PUBLICATIONS

Office Action issued in U.S. Appl. No. 14/364,388, dated Sep. 24, 2015.

Office Action issued in U.S. Appl. No. 14/364,388, dated Dec. 10, 2015.

* cited by examiner

ENGINE CONTROL APPARATUS

CROSS-REFERENCE TO RELATED APPLICATIONS

This application is a national phase application of International Application No. PCT/JP2011/072216, filed Sep. 28, 2011, the content of which is incorporated herein by reference.

TECHNICAL FIELD

This invention relates to a vehicular engine control apparatus that determines a control target value of an actuator on the basis of a plurality of operating conditions, and more particularly, to an engine control apparatus that calculates a control target value of an actuator through the use of a multicore processor having a plurality of cores.

BACKGROUND ART

In recent years, as disclosed in, for example, Japanese Patent Application Publication No. 2011-081539 (JP-2011-081539 A), the use of a calculation device that has a plurality of CPU cores mounted on a single semiconductor chip, namely, a multicore processor has been proposed in various fields. As disclosed in, for example, Japanese Patent Application Publication No. 2008-269487 (JP-2008-269487 A), the use of the multicore processor has been discussed in the field of the control of vehicular engines as well. The art disclosed in Japanese Patent Application Publication No. 2008-269487 (JP-2008-269487 A) is an art intended to reduce the consumption of electric power in the case where the multicore processor is employed in an engine control apparatus. According to this art, when a specific control processing is performed during the stop of engine control, the operation mode of a microcomputer is set to a low electric power consumption mode that is different from the operation mode during engine operation. In the low electric power consumption mode, the number of cores used by the microcomputer is made smaller than during engine operation. During the stop of engine control, no electric power is generated from an alternator or the like as during the operation of the engine, and an in-vehicle battery is not charged either. Therefore, the amount of consumption of electric power with which the battery is charged rapidly increases as the number of cores that operate during the performance of a specific control processing increases.

One advantage of the use of the multicore processor is its high processing ability. Higher processing ability can be obtained from the multicore processor than from a single core processor having one CPU core. High processing ability is an inducement to employ the multicore processor in an engine control apparatus. This is because the number of actuators mounted on the engine and the number of types thereof have been on the constant increase in recent years. In order to appropriately control the operation of the engine, the control target values of actuators thereof need to be set to appropriate values corresponding to the operating condition of the engine. Therefore, an optimization calculation is performed in a conventional engine control apparatus, but the calculation load in performing the optimization calculation increases as the number of actuators and the number of types of actuators increase. Thus, it has been apprehended that the processing ability of the single core processor that is employed in the conventional engine control apparatus may eventually become insufficient for the ever-increasing calculation load. The use of the multicore processor has a great merit in the field of engine control in which the calculation load is estimated to constantly increase from here on.

However, the processing ability of the multicore processor is not determined simply by the number of cores. In order to enhance the processing ability, a plurality of cores need to be efficiently operated. For this purpose, ingenuity has been demanded of the software that operates the cores. For example, tasks can be distributed to the plurality of the cores and processed in parallel in the multicore processor. However, the processing ability as a whole greatly differs on the method of parallelization.

RELATED ART DOCUMENTS

Patent Documents

Patent Document 1: Japanese Patent Application Publication No. 2008-269487 (JP-2008-269487 A)
Patent Document 2: Japanese Patent Application Publication No. 2011-081539 (JP-2011-081539 A)

SUMMARY OF THE INVENTION

It is a task of the invention to make it possible to calculate a control target value of an actuator or control target values of a plurality of actuators regarding engine control at a high speed through the use of a multicore processor. Then, with a view to accomplishing the task, the invention provides an engine control apparatus as follows.

The engine control apparatus provided by the invention has a multicore processor in which a plurality of cores are arranged in a manner of lattices. The lattices mentioned herein mean plane lattices, but their pattern is not limited. In addition to square lattices and rectangular lattices that are generally adopted as an arrangement pattern of cores, other patterns such as rhombic lattices and the like may also be adopted.

The invention has two particularly preferable modes. According to the first mode of the invention, the plurality of the cores that are arranged on a two-dimensional orthogonal coordinate system having axes representing a first operating condition and a second operating condition respectively are associated with the plurality of the cores that are mounted on the multicore processor, in the same line on one-on-one level. The first operating condition and the second operating condition are operating conditions that are especially important in associating the operation amount of each of actuators with a controlled variable of an engine, and one representative example thereof is a group of engine rotational speed and engine load.

The arrangement pattern of the lattice points on the two-dimensional orthogonal coordinate system is the same pattern as the arrangement pattern of the cores on the multicore processor. The cores with which the lattice points on the two-dimensional orthogonal coordinate system are associated may not be all the cores that are mounted on the multicore processor. For example, in the case where the cores are arranged on the rectangular lattices of N×M, the lattice points may be associated only with some of the cores, namely, the cores in a zone of n×m. A calculation program for calculating an optimal control value of each of the actuators at a corresponding one of the associated lattice points is allocated in advance to a corresponding one of the cores with which the lattice points are associated respectively. In the case where each of the cores has a local memory, the allocated optimal control value calculation program can be stored in the local memory. In that case, an interpolation calculation program for a later-described interpolation calculation can also be stored in the local memory of each of the cores. Hereinafter, among the cores that are mounted on the multicore processor, those cores to which optimal control value calculation program are allocated respectively will be referred to as optimal control value calculation cores.

A plurality of operation areas are defined on the aforementioned two-dimensional orthogonal coordinate system, by the plurality of the lattice points that are arranged thereon. For example, in the case where the arrangement pattern of the lattice points consists of rectangular lattices, one operation area is defined by four lattice points that are arranged at four corners of a rectangle respectively. A current operating point that is determined by respective current values of the first operating condition and the second operating condition belongs to one of the operation areas on the two-dimensional orthogonal coordinate system. Each of the optimal control value calculation cores is programmed, in the case where the operation area to which the current operating point belongs is an area that is defined by the lattice points associated with the optimal control value calculation core itself, to transmit to the interpolation calculation core the optimal control values at the relevant lattice points that are calculated by the optimal control value calculation core itself. The interpolation calculation core is programmed to calculate through interpolation an optimal control value at the current operating point, using the optimal control values at all the lattice points that define the operation area to which the current operating point belongs. The multicore processor outputs the optimal control value at the current operating point, which is obtained by being calculated through interpolation by the interpolation calculation core, as a control target value of each of the actuators.

That is, according to the first mode of the invention, the engine control apparatus calculates optimal control values at the respective lattice points by the plurality of the cores associated with the plurality of the lattice points that two-dimensionally surround the current operating point, and calculates through interpolation an optimal control value at the current operating point, on the basis of a calculation result thereof. According to this mode, the calculations of the optimal control values at the respective lattice points are performed in parallel by the separate cores. Therefore, the time needed to calculate the control target value of each of the actuators is drastically reduced in comparison with a case where the conventional single core processor is employed. Furthermore, when data on the optimal control values that are calculated by the cores respectively are given to the interpolation calculation core, a communication delay corresponding to the physical distance therebetween is caused. However, according to the first mode of the invention, the difference in communication delay time among the cores can be reduced. This is because the arrangement of the lattice points on the two-dimensional orthogonal coordinate system corresponds to the arrangement of the cores on the multicore processor, and hence the optimal control value at each of the lattice points is calculated by a group that consists of those cores which are physically closest to one another. Due to the small difference in communication delay time, the calculation can be performed with high efficiency in the processor as a whole.

By the way, the core functioning as the interpolation calculation core can be fixed to any one of the cores. In that case, one of the optimal control value calculation cores may be determined as the interpolation calculation core, or the interpolation calculation core may be selected from the cores other than the optimal control value calculation cores. However, it is more preferable that the core functioning as the interpolation calculation core be dynamically changed among the optimal control value calculation cores. In that case, each of the optimal control value calculation cores is programmed to perform the following processing in the case where the operation area to which the current operating point belongs is an area that is defined by the lattice points associated with each of the optimal control value calculation cores itself.

First of all, each of the optimal control value calculation cores determines whether or not the lattice point associated with each of the optimal control value calculation cores itself ranks as a representative lattice point among the plurality of the lattice points that define the operation area to which the current operating point belongs. For example, in the case where the arrangement pattern of the lattice points consists of rectangular lattices, one lattice point that is arranged at a predetermined position among the four lattice points that are arranged at four corners of a rectangle is selected as the representative lattice point. The core corresponding to the representative lattice point will be referred to hereinafter as a representative core. Each of the optimal control value calculation cores transmits, to another core as the representative core, the optimal control value at the lattice point associated with each of the optimal control value calculation cores itself, in the case where each of the optimal control value calculation cores itself is not the representative core. On the other hand, in the case where each of the optimal control value calculation cores itself is the representative core, each of the optimal control value calculation cores receives, from the respective cores with which the other lattice points defining the operation area to which the current operating point belongs are associated, the optimal control values that are calculated by those cores. Then, each of the optimal control value calculation cores calculates through interpolation the optimal control value at the current operating point according to the interpolation calculation program, on the basis of the optimal control values at all the lattice points that define the operation area to which the current operating point belongs. Each of the cores is programmed to perform such a processing, whereby it becomes possible not only to reduce the difference in communication delay time among the cores but also to shorten the communication delay time itself.

Incidentally, it is preferable that the optimal control value be calculated by the optimal control value calculation core according to the following procedure. According to one preferred procedure, each of the optimal control value calculation cores confirms whether or not the operation area to which the current operating point belongs is an area that is defined by the lattice points associated with each of the optimal control value calculation cores itself, at intervals of a certain time step (e.g., on a control cycle of the engine). Then, if it is confirmed that the operation area to which the current operating point belongs is an area that is defined by the lattice point associated with each of the optimal control value calculation cores itself, each of the optimal control value calculation cores calculates an optimal control value at the relevant lattice point, according to the aforementioned calculation program. On the other hand, if it is confirmed that the operation area to which the current operating point belongs is not an area that is defined by the lattice points associated with each of the optimal control value calculation cores itself, each of the optimal control value calculation cores stops calculating optimal control values at the relevant lattice points. The calculations of the optimal control values according to such a procedure are programmed into the optimal control value calculation cores respectively, whereby the consumption of electric power can be curbed while making it possible to calculate the control target value of each of the actuators at a high speed.

Besides, according to another preferred procedure regarding the calculation of the optimal control values, each of the optimal control value calculation cores first confirms whether or not an operation area that can be attained within a calculation time of each of the optimal control values overlaps with an area that is defined by the lattice points that are associated with each of the optimal control value calculation cores itself, at intervals of a certain time step (e.g., on a control cycle of the engine). Then, if it is confirmed that the operation area overlaps with the area, each of the optimal control value calculation cores calculates optimal control values at the relevant lattice points according to the aforementioned calculation program. On the other hand, if it is confirmed that the operation area does not overlap with the area, each of the optimal control value calculation cores stops calculating optimal control values at the relevant lattice points. The calculations of the optimal control values according to this procedure are programmed into the optimal control value calculation cores respectively. Thus, even in a situation where the operation state of the engine transiently changes, the control target value of each of the actuators can be calculated without being delayed with respect to the control cycle of the engine, while curbing the consumption of electric power.

On the other hand, according second mode of the invention, the plurality of the lattice points that are arranged on the three-dimensional orthogonal coordinate system having the axes representing the first operating condition, the second operating condition and the third operating condition respectively are associated with the plurality of the cores that are mounted on the multicore processor, respectively, on the same line as on the two-dimensional orthogonal coordinate system having the axes representing the first operating condition and the second operating condition respectively. The first operating condition and the second operating condition are operating conditions that are especially important in associating the operation amount of each of the actuators with the operation state of the engine, and one representative example thereof is a group of engine rotational speed and engine load. The third operating condition is arbitrary, but may be an operating condition to which priority should be given under the current operation state of the engine. For example, it is also possible to select the engine coolant temperature as the third operating condition while the engine is warmed up, and change the third operating condition to the vehicle speed or the intake air temperature after the engine has been warmed up.

The arrangement pattern of the lattice points on the two-dimensional orthogonal coordinate system having the axes representing the first operating condition and the second operating condition respectively is the same pattern as the arrangement pattern of the cores on the multicore processor. In addition, the arrangement pattern of the lattice points on the two-dimensional orthogonal coordinate system is repeated at certain intervals in the direction of the axis of the third operating condition, In consequence, the plurality of the lattice points that are equal in the respective values of the first operating condition and the second operating condition to one another and different in the value of the third operating condition from one another are associated with each of the cores. However, the cores with which the lattice points on the two-dimensional orthogonal coordinate system are associated respectively may not be all the cores that are mounted on the multicore processor. The calculation program for calculating an optimal control value of each of the actuators at the associated lattice point is allocated in advance to each of the cores with which the lattice points are associated respectively. In the case where each of the cores has a local memory, the allocated optimal control value calculation program can be stored in the local memory. In that case, an interpolation calculation program for a later-described interpolation calculation can also be stored in the local memory of each of the cores. Hereinafter, among the cores that are mounted on the multicore processor, those cores to which the optimal control value calculation program are allocated will be referred to as the optimal control value calculation cores.

A plurality of operation spaces are defined on the aforementioned three-dimensional orthogonal coordinate system, by the plurality of the lattice points that are arranged thereon. For example, in the case where the arrangement pattern of the lattice points on the two-dimensional orthogonal coordinate system having the axes representing the first operating condition and the second operating condition respectively consists of rectangular lattices, one operation space is defined by a total of eight lattice points, namely, four lattice points that are arranged at four corners of a rectangle in a lower rank and four lattice points that are arranged at four corners of a rectangle in an upper rank. The current operating point that is determined by the respective current values of the respective operating conditions belongs to any of the operation spaces on the three-dimensional orthogonal coordinate system. Each of the optimal control value calculation cores is programmed, in the case where the operation space to which the current operating point belongs is a space that is defined by any of the lattice points associated with each of the optimal control value calculation cores itself, to transmit to the interpolation calculation core the optimal control values at the lattice points that define the operation space that is calculated by each of the optimal control value calculation cores itself. Incidentally, the calculation of the optimal control value by the optimal control value calculation core is performed as to the two lattice points that are equal in the respective values of the first operating condition and the second operating condition to each other and different in the value of the third operating condition from each other. The interpolation calculation core is programmed to calculate through interpolation an optimal control value at the current operating point, using the optimal control values at all the lattice points that define the operation space to which the current operating point belongs. The multicore processor outputs the optimal control value at the current operating point, which is obtained by being calculated through interpolation by the interpolation calculation core, as a control target value of each of the actuators.

That is, according to the second mode of the invention, the engine control apparatus calculates optimal control values at the respective lattice points by the plurality of the cores associated with the plurality of the lattice points that three-dimensionally surround the current operating point, and calculates through interpolation the optimal control value at the current operating point on the basis of a calculation result thereof. Thus, the calculations of the optimal control values at the respective lattice points are performed dispersedly by the plurality of the cores that operate in parallel. Therefore, the time needed to calculate the control target value of each of the actuators is drastically reduced in comparison with a case where the conventional single core processor is employed. Furthermore, when data on the optimal control value that is calculated by each of the cores are given to the interpolation calculation core, a communication delay corresponding to the physical distance therebetween is caused. However, according to the second mode of the invention, the difference in communication delay time among the cores can be reduced. This is because the arrangement of the lattice points on the two-dimensional orthogonal coordinate system having the axes representing the first operating condition and the second operating condition respectively corresponds to the arrangement of the cores on the multicore processor, and hence the optimal control values at the respective lattice points are calculated by a group of the cores that are physically closest to one another. Because of the small difference in communication delay time, the calculation can be performed with high efficiency in the processor as a whole.

Furthermore, according to the second mode of the invention, finer engine control can be realized by causing the control target value of each of the actuators to reflect the third operating condition. In particular, in the case where the operating condition that should be the third operating condition is selected from the plurality of the operating conditions defined in advance, in accordance with the operation state of the engine, more appropriate engine control corresponding to the operation state of the engine can be realized.

In the second mode of the invention as well, the core functioning as the interpolation calculation core can be fixed to any one of the cores. In that case, one of the optimal control value calculation cores may be determined as the interpolation calculation core, or the interpolation calculation core may be selected from the cores other than the optimal control value calculation cores. However, it is more preferable that the core functioning as the interpolation calculation core be dynamically changed among the optimal control value calculation cores. In that case, each of the optimal control value calculation cores is programmed to perform the following processing in the case where the operation space to which the current operating point belongs is a space that is defined by the lattice points associated with each of the optimal control value calculation cores itself.

First of all, each of the optimal control value calculation cores determines whether or not the lattice point associated with each of the optimal control value calculation cores itself ranks as a representative lattice point among the plurality of the lattice points that define the operation space to which the current operating point belongs. For example, in the case where the arrangement pattern of the lattice points on the two-dimensional orthogonal coordinate system having the axes representing the first operating condition and the second operating condition respectively consists of rectangular lattices, one lattice point that is arranged at a predetermined position among the four lattice points that are arranged at four corners of a rectangle is selected as the representative lattice point. The core corresponding to the representative lattice point will be referred to hereinafter as a representative core. Each of the optimal control value calculation cores transmits, to another core as the representative core, the optimal control value at the lattice point associated with each of the optimal control value calculation cores itself, in the case where each of the optimal control value calculation cores itself is not the representative core. On the other hand, in the case where each of the optimal control value calculation cores itself is the representative core, each of the optimal control value calculation cores receives, from the respective cores with which the other lattice points defining the operation space to which the current operating point belongs are associated, the optimal control values that are calculated by those cores. Then, each of the optimal control value calculation cores calculates through interpolation the optimal control value at the current operating point according to the interpolation calculation program, on the basis of the optimal control values at all the lattice points that define the operation space to which the current operating point belongs. Each of the cores is programmed to perform such a processing, whereby it becomes possible not only to reduce the difference in communication delay time among the cores but also to shorten the communication delay time itself.

Incidentally, it is preferable that the optimal control value be calculated by the optimal control value calculation core according to the following procedure. According to one preferred procedure, each of the optimal control value calculation cores confirms whether or not the operation space to which the current operating point belongs is a space that is defined by any of the lattice points associated with each of the optimal control value calculation cores itself, at intervals of a certain time step (e.g., on a control cycle of the engine). Then, if it is confirmed that the operation space to which the current operating point belongs is a space that is defined by any of the lattice points associated with each of the optimal control value calculation cores itself, each of the optimal control value calculation cores calculates an optimal control value at the lattice point associated with each of the optimal control value calculation cores itself among the lattice points that define the operation space, according to the aforementioned calculation program. On the other hand, if it is confirmed that the operation space to which the current operating point belongs is not a space that is defined by the lattice points associated with each of the optimal control value calculation cores itself, each of the optimal control value calculation cores stops calculating optimal control values at all the lattice points associated with each of the optimal control value calculation cores itself. The calculations of the optimal control values according to this procedure are programmed into the optimal control value calculation cores respectively, whereby the consumption of electric power can be curbed while making it possible to calculate the control target value of each of the actuators at a high speed.

Besides, according to another preferred procedure regarding the calculation of the optimal control values, each of the optimal control value calculation cores first confirms whether or not an operation space that can be attained within a calculation time of each of the optimal control values overlaps with a space that is defined by any of the lattice points that are associated with each of the optimal Control value calculation cores itself, at intervals of a certain time step (e.g., on a control cycle of the engine). Then, if it is confirmed that the operation space overlaps with the space, each of the optimal control value calculation cores calculates an optimal control value at the lattice point associated with each of the optimal control value calculation cores itself among the lattice points defining the space that overlaps with the operation space, according to the aforementioned calculation program. On the other hand, if it is confirmed that the operation space does not overlap with the space, each of the optimal control value calculation cores stops calculating optimal control values at all the lattice points associated with each of the optimal control value calculation cores itself. The calculations of the optimal control values according to such a procedure are programmed into the optimal control value calculation cores respectively. Thus, even in a situation where the operation state of the engine transiently changes, the control target value of each of the actuators can be calculated without being delayed with respect to the control cycle of the engine, while curbing the consumption of electric power.

MODES FOR CARRYING OUT THE INVENTION

First Embodiment

An engine control apparatus according to the first embodiment of the invention will be described with reference to the drawings.

The engine control apparatus to which the invention is applied is an apparatus that calculates control target values of actuators regarding engine control through the use of a multicore processor. In the invention, there is no limit to the type or structure of a vehicular engine that is controlled by the engine control apparatus, and there is no limit to the types or number of actuators either. For example, the engine control apparatus according to this embodiment of the invention may be a control apparatus for a gasoline engine. In that case, the engine control apparatus calculates control target values of actuators such as a throttle, an ignition device, injectors, an EGR valve, a variable valve gear, a waste gate valve and the like. Besides, the engine control apparatus according to this embodiment of the invention may be a control apparatus for a diesel engine. In that case, the engine control apparatus calculates control target values of actuators such as injectors, an EGR valve, a diesel throttle, a variable nozzle turbo and the like.

Figure 1:
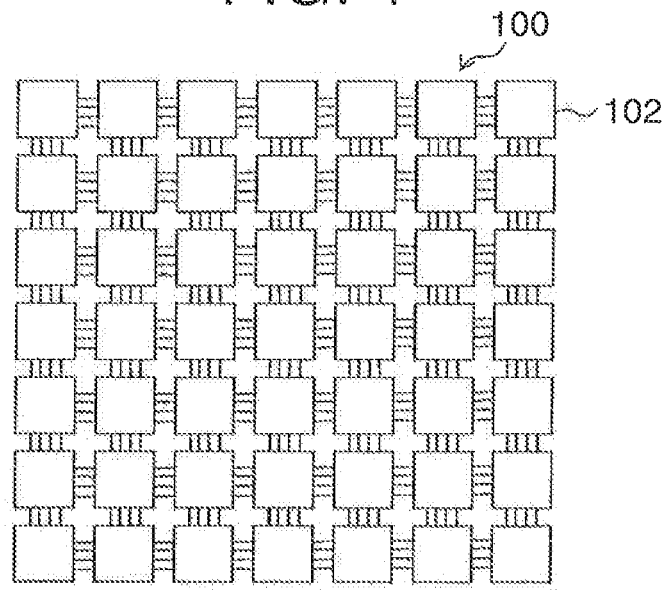
FIG. 1 is a view showing the arrangement of cores of a multicore processor according to embodiments of the invention.

FIG. 1 is a view showing the arrangement of cores of a multicore processor as part of the engine control apparatus according to this embodiment of the invention. A multicore processor 100 according to this embodiment of the invention is structurally characterized in that a plurality of cores 102 are arranged in a latticed manner. The multicore processor 100 shown in FIG. 1 has a latticed pattern of rectangular lattices in which a total of the forty-nine cores 102 are arranged in 7 rows and 7 columns.

Figure 2:
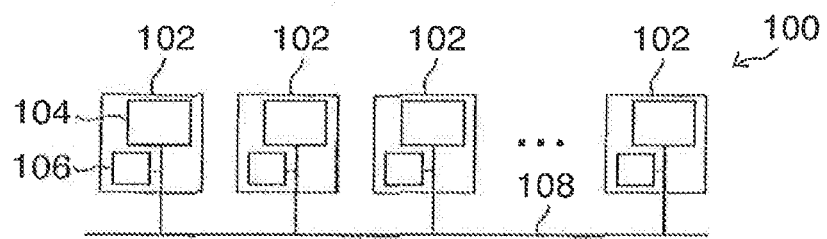
FIG. 2 is a view showing the outline of a hardware architecture of the multicore processor according to the embodiments of the invention.

FIG. 2 is a view showing the outline of a hardware architecture of the multicore processor 100. Each of the cores 102 is equipped with a corresponding one of cash-equipped CPU's 104 and a corresponding one of local memories 106, and the cores 102 are connected to one another by a bus 108. Various programs that are executed by each of the CPU's 104 and various data that are used during the execution of the programs are stored in a corresponding one of the local memories 106. Besides, although not shown in the drawing, a shared memory that is shared among the cores is also connected to the bus 108.

Figure 3:
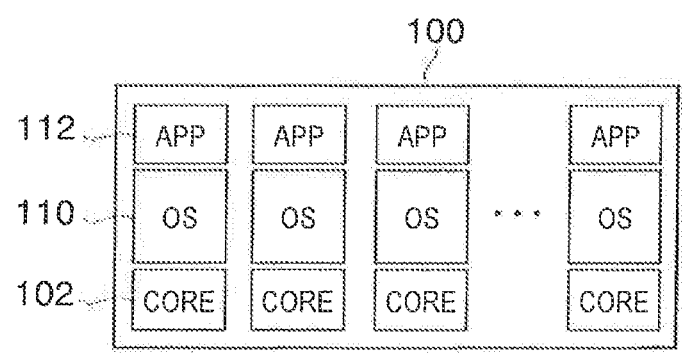
FIG. 3 is a view showing the outline of a software architecture of the multicore processor according to the embodiments of the invention.

FIG. 3 is a view showing the outline of a software architecture of the multicore processor 100. In the multicore processor 100, different OS's 110 operate on the cores 102 respectively. Besides, different applications 112 operate on the OS's 110 respectively. An optimal control value calculation program and an interpolation calculation program, which will be described later, are examples of those applications 112. The OS 110 and the application 112 that are associated with each of the cores 102 are individually installed in a corresponding one of the local memories 106 of that core 102. In the multicore processor 100 having such a software architecture, each of the cores 102 can independently execute a corresponding one of the applications 112.

In the case where calculation results obtained by the other cores 102 and data of the other cores 102 are needed to execute each of the applications 112, the data are exchanged by core-to-core communication (OS-to-OS communication) through the bus 108.

The engine control apparatus according to this embodiment of the invention acquires respective current values of an engine rotational speed and an engine load, and determines control target values of the respective actuators on the basis of those values. If the engine rotational speed and the engine load are determined, the control target values of the respective actuators that can optimize an operation state of the engine can be specified. For that specification, adaptive data that are obtained by actually testing the engine can be used. However, if an attempt is made to obtain adaptive data as to all combinations of the engine rotational speed and the engine load, an adaptive operation costs an enormous length of time and enormous quantities of man-hours. It is thus proposed to acquire adaptive data as to certain specific combinations of the engine rotational speed and the engine load, and perform an interpolation calculation on the basis of the acquired adaptive data as to the other combinations. The engine control apparatus according to this embodiment of the invention performs a calculation of the actuator control target values with the aid of the interpolation calculation, in a parallel manner through the use of the multicore processor 100.

Figure 4:
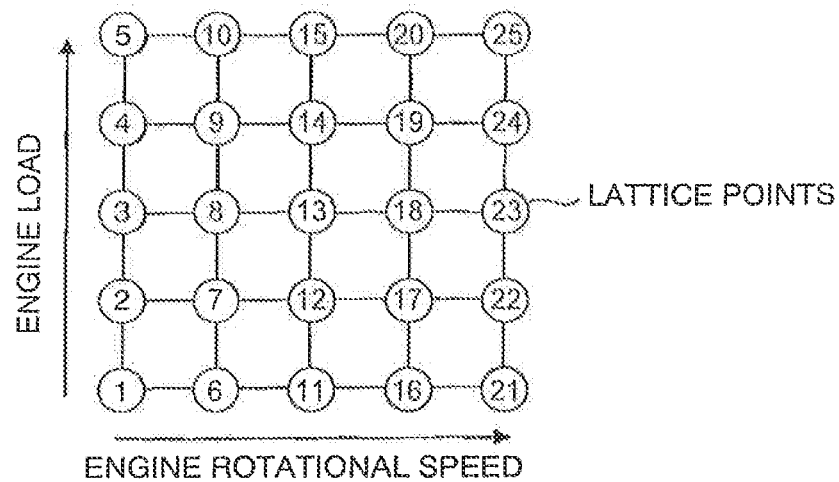
FIG. 4 is a view showing the arrangement of lattice points on a two-dimensional orthogonal coordinate system having axes representing an engine rotational speed and an engine load respectively.

The adaptive data that are used in the multicore processor 100 are prepared as to combinations of the engine rotational speed and the engine load indicated by lattice points in FIG. 4. FIG. 4 is a view showing the arrangement of the lattice points on a two-dimensional orthogonal coordinate system having axes representing the engine rotational speed and the engine load respectively. The twenty-five lattice points are arranged in five rows and five columns on this two-dimensional orthogonal coordinate system. Incidentally, numerals assigned to the respective lattice points are lattice point numbers thereof. In the case where a specific one of the lattice points will be described in the following description, it will be specified by the lattice point number thereof. The latticed pattern that is assumed by the lattice points on the two-dimensional orthogonal coordinate system consists of rectangular lattices as is the case with the latticed pattern of the multicore processor 100. In each of the rectangular lattices, one operation area is defined by four lattice points that are arranged at four corners of a rectangle respectively. In consequence, a total of sixteen operation areas are defined in the two-dimensional orthogonal coordinate system shown in FIG. 4. Associated with each of the lattice points are adaptive data that are adapted to the engine rotational speed and the engine load at that position. The adaptive data at each of the lattice points are incorporated into a later-described optimal control value calculation program, and are allocated to the core 102 with which the relevant lattice point is associated.

Figure 5:
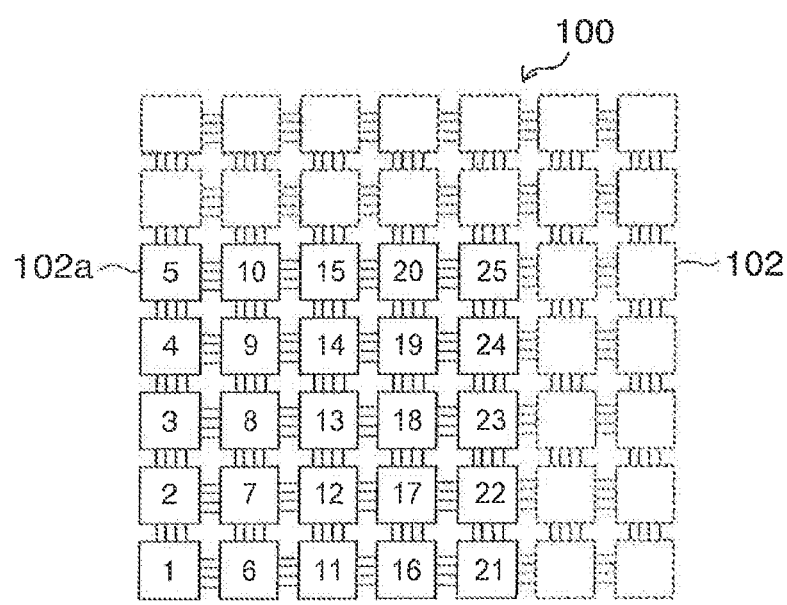
FIG. 5 is a view showing how a plurality of the lattice points arranged on the two-dimensional orthogonal coordinate system and a plurality of the cores on the multicore processor are associated with one another.

FIG. 5 is a view showing how the lattice points that are arranged on the two-dimensional orthogonal coordinate system shown in FIG. 4 and the cores 102 on the multicore processor 100 are associated with one another respectively. The numerals assigned to some of the cores 102 mounted on the multicore processor 100 are core numbers thereof. In the case where a specific one of the cores will be described in the following description, it will be specified by the core number thereof. As is apparent from a contrast between FIG. 4 and FIG. 5, the lattice points #1 to #25 that are arranged on the two-dimensional orthogonal coordinate system are associated with the cores 102a #1 to #25 on one-on-one level respectively on the same line as on the two-dimensional orthogonal coordinate system. Hereinafter, among the cores 102 that are mounted on the multicore processor 100, those cores with which the lattice points are associated respectively will be distinguished from the other cores by the reference symbol 102a. An optimal control value calculation program that employs adaptive data adapted to the engine rotational speed and the engine load at each of the lattice points is allocated to a corresponding one of the cores 102a with which that lattice point is associated. In combination with an interpolation calculation program, the optimal control value calculation program is installed in each of the local memories 106. The optimal value calculation program is a program that calculates optimal control values of the actuators through the use of an engine performance model. The aforementioned adaptive data are used as the values of parameters of the engine performance model. In the multicore processor 100 according to this embodiment of the invention, among the forty-nine cores 102, the twenty-five cores 102a #1 to #25 function as optimal value calculation cores for calculating the actuator control target values, and the other cores 102 are in charge of other processes needed for engine control.

Figure 6:
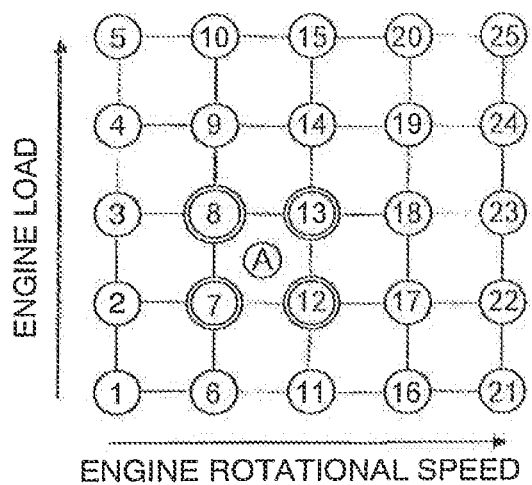
FIG. 6 is a view for explaining a method of calculating a control target value of each of actuators according to the first embodiment of the invention.
Figure 7:
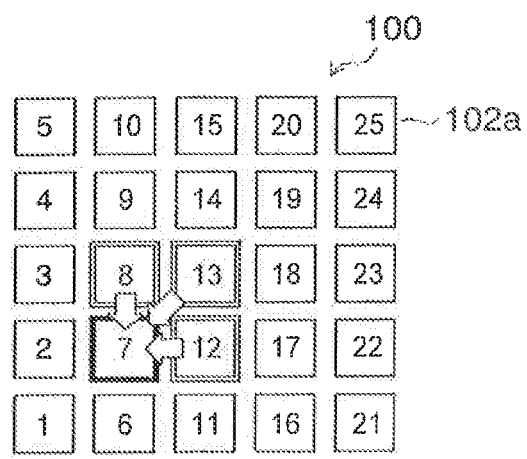
FIG. 7 is a view for explaining a method of calculating the control target value of each of the actuators according to the first embodiment of the invention.

Next, a method of calculating the control target values of the actuators through the use of the multicore processor 100 will be described using FIGS. 6 and 7. In a two-dimensional orthogonal coordinate system shown in FIG. 6, a point A indicates an operating point that is determined by respective current values of the engine rotational speed and the engine load, namely, a current operating point. The current time as mentioned herein means a current time point at which a current time step is started. In order to appropriately control the engine, it is necessary to calculate optimal control values of the actuators at the current operating point, and set them as control target values of the actuators respectively. However, the adaptive data for calculating optimal control values in the two-dimensional orthogonal coordinate system are prepared only for the lattice points #1 to #25, and no adaptive data are prepared in the other areas. In consequence, the optimal control values at the current operating point cannot be directly calculated according to the optimal control value calculation program.

Thus, in this embodiment of the invention, optimal control values at the four lattice points that surround the current operating point are calculated, and those values are used to perform an interpolation calculation of an optimal control value at the current operating point. In an example shown in FIG. 6, the current operating point A belongs to an area that is defined by the lattice points #7, #8, #12 and #13, which are surrounded by double circles respectively. In consequence, if the optimal control values at these lattice points are known, the optimal control value at the current operating point A can be obtained through the interpolation calculation using those values.

The optimal control value at the current operating point A is specifically calculated according to the following procedure. First of all, in the arrangement of the cores shown in FIG. 7, the multicore processor 100 uses, for the calculation, the cores 102a #7, #8, #12 and #13 that correspond to the lattice points #7, #8, #12 and #13 respectively. Each of these cores 102a calculates an optimal control value at the lattice point associated with each of the cores 102a itself, according to the optimal control value calculation program that is installed in the local memory 106 of each of the cores 102a itself. At this time, the optimal control values are calculated in parallel by the respective cores 102a #7, #8, #12 and #13. After the optimal control values have been calculated by the respective cores 102a, data on a calculation result thereof are gathered on a representative one of the four cores 4. Each of the cores 102a is programmed to recognize, as a representative lattice point, that lattice point which is closest to the origin in the two-dimensional orthogonal coordinate system among the four lattice points surrounding the current operating point, and to recognize, as a representative core, the core with which the representative lattice point is associated. In an example shown in FIG. 7, the core 102a #7 is a representative core. The core 102a #7 as the representative core calculates through interpolation an optimal control value at the current operating point A according to the interpolation calculation program that is installed in the local memory 106 of the core 102a #7 itself, using the data on the optimal control values calculated by the core 102a #7 itself and data on the optimal control values received from the cores 102a #8, #12 and #13.

According to the method described above, the optimal control values at the four lattice points needed for the interpolation calculation are calculated in parallel by the separate cores 102a respectively. Thus, the time needed to calculate the control target values of the actuators can be drastically reduced in comparison with a case where a conventional single core processor is employed. Furthermore, the arrangement of the lattice points on the two-dimensional orthogonal coordinate system corresponds to the arrangement of the cores 102a on the multicore processor 100. Therefore, the optimal control values at the four lattice points can be calculated by the four cores 102a that are physically closest to one another. Besides, one of the four cores 102a functions as the interpolation calculation core. This makes it possible not only to reduce the difference in communication delay time that is caused when the data on the optimal control values calculated by the respective cores are given to the interpolation calculation core, but also to shorten the communication delay time itself.

Figure 8:
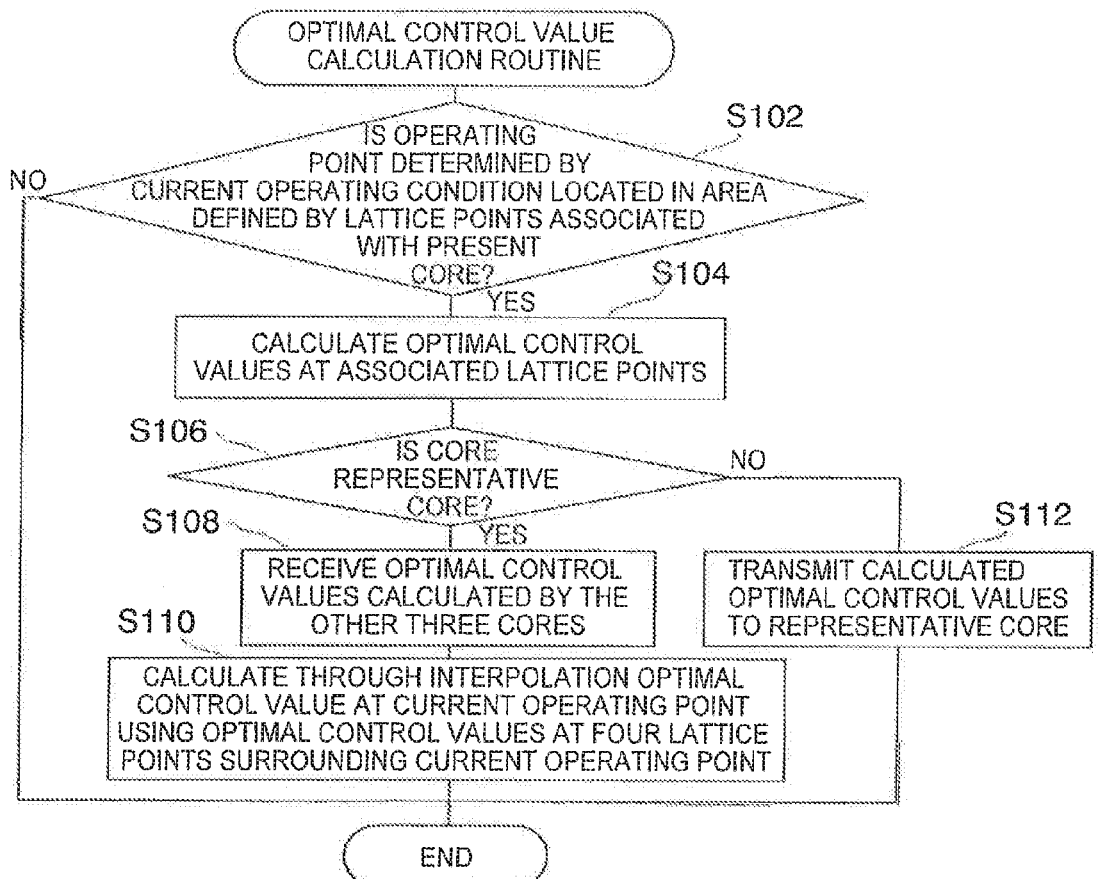
FIG. 8 is a flowchart showing an optimal control value calculation routine that is executed by each of the cores in the first embodiment of the invention.

Incidentally, the method described above is carried out through the execution of an optimal control value calculation routine shown in a flowchart of FIG. 8 in each of the cores 102a. This routine is executed at intervals of a certain time step (e.g., on a control cycle of the engine) for each of the cores 102a, through the application that is installed in a corresponding one of the local memories 106 of each of the cores 102a.

In step S102 as a first step of the flowchart of FIG. 8, the core 102a acquires respective current values of the engine rotational speed and the engine load. Those values are calculated on the basis of output values of sensors by the cores 102 other than an optimal control value calculation core. Subsequently, the core 102a specifies a current operating point from the respective current values of the engine rotational speed and the engine load, and determines whether or not the current operating point is located in an area that is defined by the lattice points associated with the core 102a itself. For example, if the relevant tore 102a is the core #7, it is determined which one of the four rectangular areas having the core #7 as an apex contains the current operating point.

If the result of the determination in step S102 is negative, the core 102a stops calculating an optimal control value, and ends the calculation in the current time step. This is because wasteful consumption of electric power should be curbed.

If the result of the determination in step S102 is positive, the core 102a performs a process of step S104. In step S104, the core 102a executes the optimal control value calculation program, and calculates an optimal control value at the lattice point that is associated with the core 102a itself.

Subsequently in step S106, the core 102a determines whether or not the core 102a itself ranks as a representative core. It can be determined whether or not the core 102a is a representative core, from a positional relationship between the lattice point associated with the core 102a itself and the current operating point.

If the result of the determination in step S106 is negative, the core 102a performs a process of step S112. In step S112, the core 102a transmits data on the optimal control value, which is calculated by the core 102a itself, to the representative core. It can be determined which core ranks as the representative core, from a coordinate of the current operating point on the two-dimensional orthogonal coordinate system. The calculation in the current time step by the relevant core 102a ends through the transmission of the data on the optimal control values.

If the result of the determination in step S106 is positive, the core 102a performs a process of step S108. In step S108, the core 102a receives, from the respective cores with which the other lattice points defining the operation area to which the current operating point belongs are associated, data on the optimal control values that are calculated by those cores respectively. For example, if the current operating point is located as indicated by the point A in FIG. 6 and the relevant core 102a is the core #7, the core 102a receives, from the respective cores 102a #8, #12 and #13, data on the optimal control values calculated by those cores respectively.

Subsequently in step S110, the core 102a as the representative core calculates through interpolation an optimal control value at the current operating point according to the interpolation calculation program, on the basis of the optimal control values at the four lattice points, which include the optimal control value calculated by the core 102a itself. The optimal control value at the current operating point, which is obtained by being calculated through interpolation, is output as a control target value of each of the actuators. Thus, the calculation in the current time step by the relevant core 102a ends.

The consumption of electric power can be curbed while making it possible to calculate the control target values of the actuators at a high speed, through the execution of the foregoing routine in each of the cores 102a.

Second Embodiment

Next, an engine control apparatus according to the second embodiment of the invention will be described with reference to the drawings.

The difference between this embodiment of the invention and the first embodiment of the invention consists in the method of calculating the control target values of the actuators through the use of the multicore processor 100. The arrangement of the cores 102 in the multicore processor 100, the hardware architecture of the multicore processor 100, and the software architecture of the multicore processor 100 are identical to those of the first embodiment of the invention shown in FIGS. 1, 2 and 3, respectively. Besides, lattice points are arranged on a two-dimensional orthogonal coordinate system having axes representing an engine rotational speed and an engine load respectively according to the same method as in the first embodiment of the invention, and those lattice points are associated with the cores 102 on the multicore processor 100 respectively according to the same method as in the first embodiment of the invention.

In the first embodiment of the invention, the optimal control values at the four lattice points surrounding the current operating point are calculated, and the optimal control value at the current operating point is calculated on the basis of those values. However, in a situation where the operation state of the engine transiently changes, the position of the operating point on the two-dimensional orthogonal coordinate system may change while each of the cores 102a calculates an optimal control value. In that case, there may be created a discrepancy between the optimal control value that is obtained by being calculated through interpolation according to the method of the first embodiment of the invention and the optimal control value at the true current operating point. Then, in this embodiment of the invention, a method of accurately calculating the control target values of the actuators in the situation where the operation state of the engine transiently changes is proposed.

Figure 9:
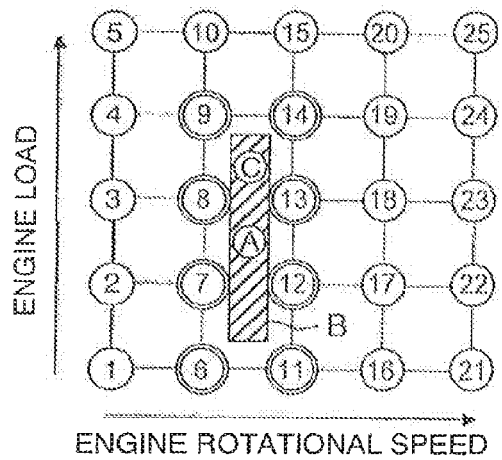
FIG. 9 is a view for explaining a method of calculating a control target value of each of actuators according to the second embodiment of the invention.

In a two-dimensional orthogonal coordinate system shown in FIG. 9, a point A indicates an operating point that is determined from respective values of an engine rotational speed and an engine load at a time point when the current time step is started. A hatched area B indicates an operation area that can be attained within a calculation time of an optimal control value by each of the cores 102a with respect to the point A. If it is assumed that the engine rotational speed at the point A is denoted by NEa (rpm), and that the engine load at the point A is denoted by KU (%), this area B is calculated as a range where the engine rotational speed is NEa±ΔNE (rpm) and the engine load is KLa±ΔKL (%). It should be noted herein that ΔNE denotes a maximum amount of change in the engine rotational speed that is predicted within the calculation time of an optimal control value, and that ΔKL denotes a maximum amount of change in the engine load that is predicted within the calculation time of an optimal control value. The respective values of ΔNE and ΔKL are determined in advance in a map that uses the engine rotational speed and the engine load as arguments.

The area B indicates an area in which the operating point can exist upon the completion of the calculation of an optimal control value. Then, in this embodiment of the invention, optimal control values are calculated in advance as to all the lattice points surrounding the area B as well as the lattice points surrounding the point A. In an example shown in FIG. 9, the area B overlaps with an area that is defined by the lattice points #6, #7, #11 and #12, an area that is defined by the lattice points #7, #8, #12 and #13, and an area that is defined by the lattice points #8, #9, #13 and #14. In consequence, if the optimal control values at the lattice points #6, #7, #8, #9, #11, #12, #13 and #14 are calculated in advance, the optimal control value at the current time point when the calculation of the optimal control value is completed can be obtained by being calculated through interpolation, regardless of the operation area in which that operating point is located. In the example shown in FIG. 9, the operating point at the current time point when the interpolation calculation is started is located at a point C. In this case, the optimal control values at the lattice points #8, #9, #13 and #14, which have already been calculated, can be used. Therefore, the optimal control value at the current operating point C can be calculated through interpolation without being delayed with respect to the control cycle of the engine.

Figure 10:
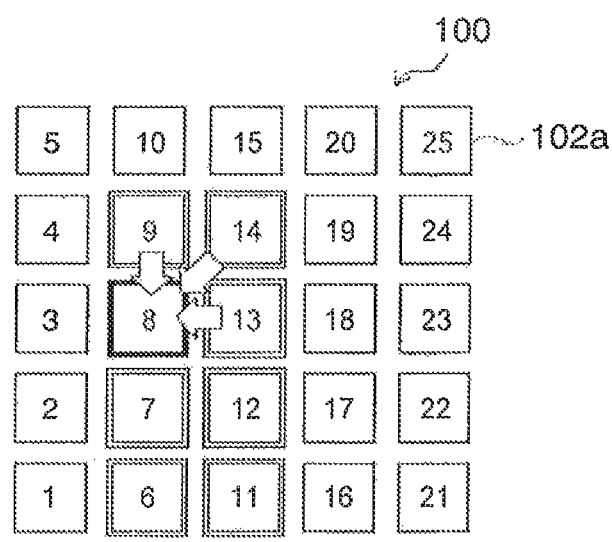
FIG. 10 is a view for explaining a method of calculating the control target value of each of the actuators according to the second embodiment of the invention.

The calculation according to this embodiment of the invention is specifically carried out according to the following procedure. First of all, in the arrangement of the cores shown in FIG. 10, the multicore processor 100 uses, for the calculation, the cores 102a #6, #7, #8, #9, #11, #12, #13 and #14 that correspond to the lattice points #6, #7, #8, #9, #11, #12, #13 and #14 respectively. The calculations of optimal control values by these cores 102a are performed in parallel. If the calculation of an optimal control value is completed in each of the cores 102a, the engine rotational speed and the engine load at that time point are acquired, and a position of the current operating point on the two-dimensional orthogonal coordinate system is specified. Then, if the current operating point is in an operation area that is surrounded by the lattice points #8, #9, #13 and #14, only data on the optimal control values calculated by the cores 102a #8, #9, #13 and #14 are gathered on the representative core. In an example shown in FIG. 10, the core 102a #8 is the representative core. The core 102a #8 as the representative core calculates through interpolation an optimal control value at the current operating point C according to the interpolation calculation program that is installed in the local memory 106 of the core 102a itself, using data on the optimal control value calculated by the core 102a #8 itself, and data on the optimal control values received from the cores 102a #9, #13 and #14.

Figure 11:
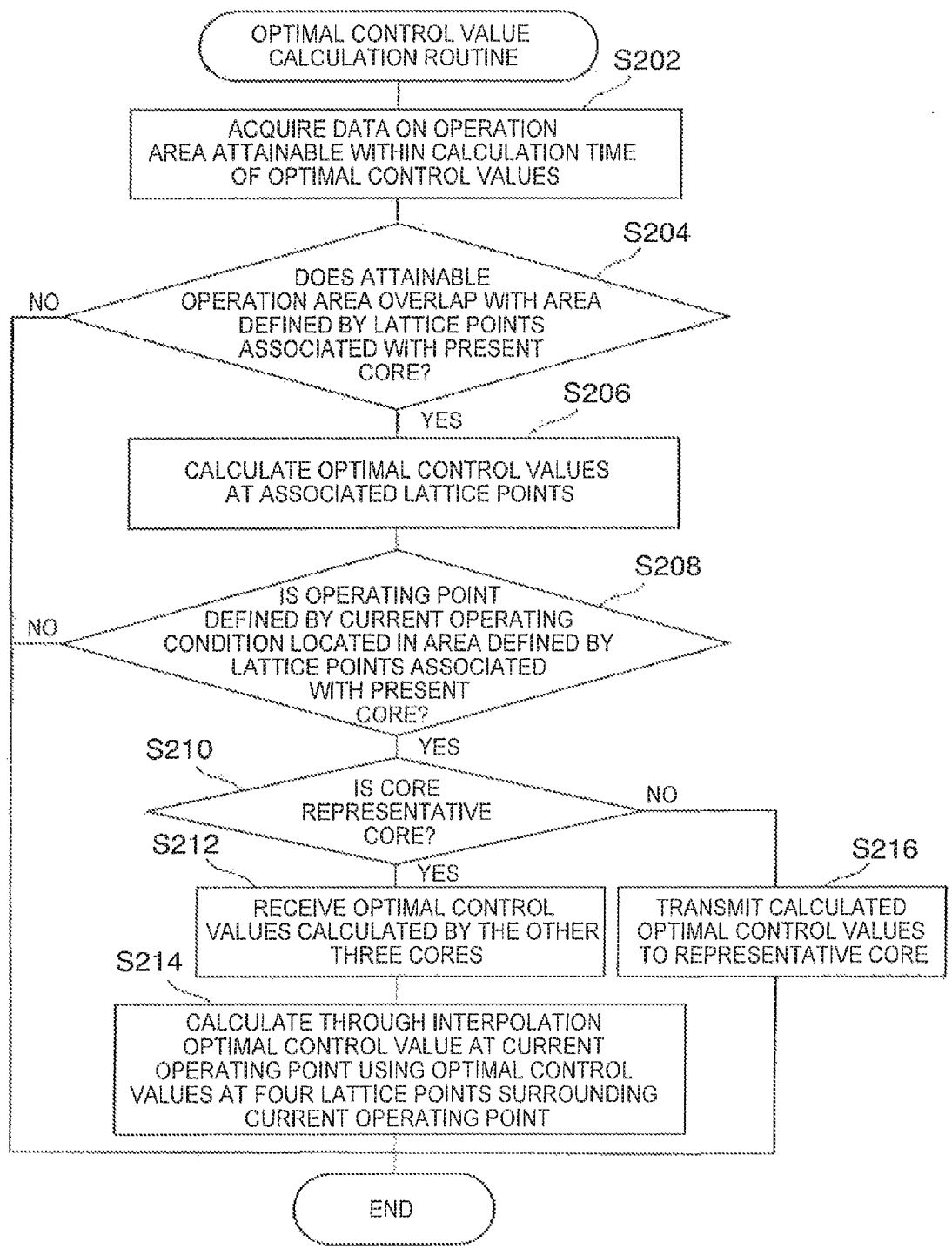
FIG. 11 is a flowchart showing an optimal control value calculation routine that is executed by each of the cores in the second embodiment of the invention.

The method described above is carried out through the execution of an optimal control value calculation routine shown in a flowchart of FIG. 11 in each of the cores 102a. This routine is executed at intervals of a certain time step (e.g., on a control cycle of the engine) for each of the cores 102a, through the application that is installed in a corresponding one of the local memories 106 of each of the cores 102a.

In step S202 as a first step of the flowchart of FIG. 11, the core 102a acquires data on an operation area that can be attained within a calculation time of an optimal control value from the current time point. The operation area that can be attained is calculated by the cores 102 other than the optimal control value calculation core.

Subsequently in step S204, the core 102a determines whether or not the operation area acquired in step S202 overlaps with an area that is defined by the lattice point associated with the core 102a itself. For example, if the relevant core 102a is the core #8, it is determined which one of the four rectangular areas having the lattice point #8 as an apex overlaps with the operation area acquired in step S202.

If the result of the determination in step S204 is negative, the core 102a stops calculating an optimal control value, and ends the calculation in the current time step. This is because wasteful consumption of electric power should be curbed.

If the result of the determination in step S204 is positive, the core 102a performs a process of step S206. In step S206, the core 102a executes the optimal control value calculation program, and calculates an optimal control value at the lattice point that is associated with the core 102a itself.

Subsequently in step S208, the core 102a acquires respective current values of the engine rotational speed and the engine load. Then, the core 102a specifies a current operating point on the two-dimensional orthogonal coordinate system, and determines whether or not the current operating point is located in an area that is defined by the lattice point associated with the core 102a itself. For example, if the core 102a is the core #8, the core 102a determines whether or not which one of the four rectangular areas having the lattice point #8 as an apex contains the current operating point.

If the result of the determination in step S208 is negative, the core 102a nullifies the calculation result of the optimal control value, and ends the calculation in the current time step.

If the result of the determination in step S208 is positive, the core 102a performs a process of step S210. In step S210, the core 102a determines whether or not the core 102a itself ranks as a representative core. It can be determined whether or not the core 102a is the representative core, from a positional relationship between the lattice points associated with the core 102a itself and the current operating point.

If the result of the determination in step S210 is negative, the core 102a performs a process of step S216. In step S216, the core 102a transmits to the representative core data on the optimal control value that is calculated by the core 102a itself. It can be determined which one of the cores ranks as the representative core, from the coordinate of the current operating point on the two-dimensional orthogonal coordinate system. The calculation in the current time step by the relevant core 102a ends through the transmission of the data on the optimal control value.

If the result of the determination in step S210 is positive, the core 102a performs a process of step S212. In step S212, the core 102a receives, from the respective cores with which the other lattice points defining the operation area to which the current operating point belongs are associated, data on the optimal control values calculated by those cores respectively. For example, if the current operating point is located as indicated by the point C in FIG. 10 and the relevant core 102a is the core #8, the relevant core 102a receives, from the respective cores #9, #13 and #14, data on the optimal control values calculated by those cores respectively.

Subsequently in step S214, the core 102a as a representative core calculates through interpolation an optimal control value at the current operating point according to the interpolation calculation program, on the basis of the optimal control values at the four lattice points including the optimal control value calculated by the core 102a itself. The optimal control value at the current operating point, which is obtained by being calculated through interpolation, is output as a control target value of each of the actuators. Thus, the calculation in the current time step by the relevant core 102a ends.

Through the execution of the foregoing routine in each of the cores 102a, the control target value of a corresponding one of the actuators can be calculated without being delayed with respect to the control cycle of the engine while curbing the consumption of electric power, even in a situation where the operation state of the engine transiently changes.

Third Embodiment

Next, an engine control apparatus according to the third embodiment of the invention will be described with reference to the drawings.

This embodiment of the invention is different from the first and second embodiments of the invention in the number of operating conditions serving as a basis in determining control target values of the actuators. In this embodiment of the invention, the control target values of the actuators are determined on the basis of the engine coolant temperature as a third operating condition as well as the engine rotational speed and the engine load as the first and second operating conditions. Thus, this embodiment of the invention is different from the first and second embodiments of the invention also in the method of calculating control target values of the actuators through the use of the multicore processor 100. The arrangement of the cores 102 in the multicore processor 100, the hardware architecture of the multicore processor 100, and the software architecture of the multicore processor 100 are identical to those of the first embodiment of the invention shown in FIGS. 1, 2 and 3.

The engine control apparatus according to this embodiment of the invention acquires respective current values of the engine rotational speed, the engine load and the engine coolant temperature, and determines the control target values of the respective actuators on the basis of those values. The engine coolant temperature is a factor that has a great influence on a relationship between the operation amount of each of the actuators and the operation state of the engine especially in a warm-up process of the engine. In the engine control apparatus according to this embodiment of the invention, adaptive data are prepared only as to a certain specific combination of the engine rotational speed, the engine load and the engine coolant temperature, and the other combinations are supplemented by an interpolation calculation based on the prepared adaptive data.

Figure 12:
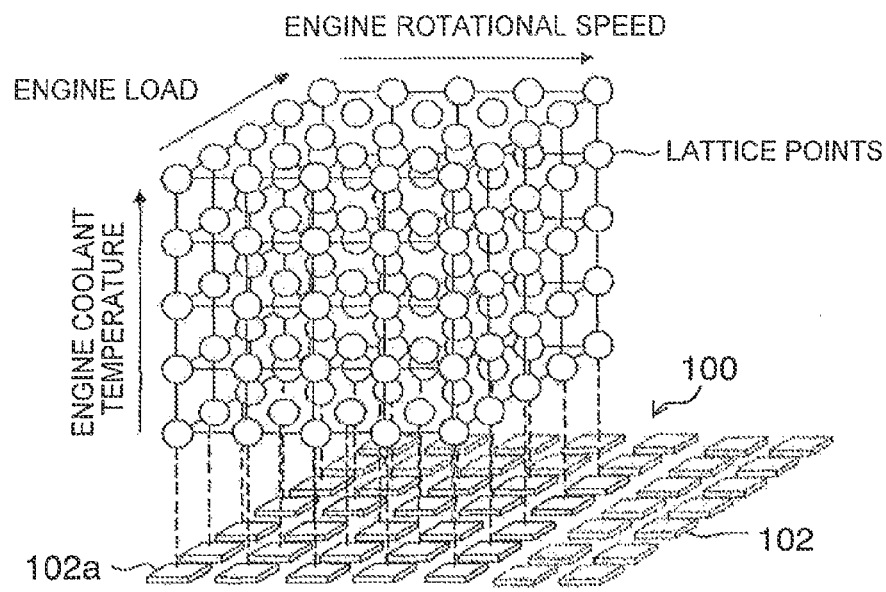
FIG. 12 is a view showing how a plurality of the lattice points arranged on a three-dimensional orthogonal coordinate system and a plurality of the cores on the multicore processor are associated with one another.

The adaptive data that are used in the multicore processor 100 are prepared as to a combination of the engine rotational speed, the engine load and the engine coolant temperature that are indicated by lattice points in FIG. 12. FIG. 12 shows the arrangement of the lattice points on a three-dimensional orthogonal coordinate system having an X-axis representing the engine rotational speed, a Y-axis representing the engine load, and a Z-axis representing the engine coolant temperature. The one hundred twenty-five lattice points are arranged on this three-dimensional orthogonal coordinate system in five rows, five columns and five stages. The three-dimensional latticed pattern that is assumed by the lattice points on the three-dimensional orthogonal coordinate system consists of simple cubic lattices, and the latticed pattern on the two-dimensional orthogonal coordinate system having axes representing the engine rotational speed and the engine load respectively consists of rectangular lattices as is the case with the latticed pattern of the multicore processor 100. According to this latticed pattern, one operation space is defined by eight lattice points that are arranged at apices of a cube as a unit lattice. Adaptive data that are adapted to the engine rotational speed, the engine load and the engine coolant temperature at the position of each of the lattice points are associated therewith. The adaptive data at each of the lattice points are incorporated into the optimal control value calculation program, and are allocated to the core 102 with which the relevant lattice point is associated.

FIG. 12 also shows how the lattice points arranged on the three-dimensional orthogonal coordinate system and the cores 102 on the multicore processor 100 are associated with one another respectively. The one hundred twenty-five lattice points that are arranged on the three-dimensional orthogonal coordinate system are associated with the twenty-five cores 102a on the same line as on the two-dimensional orthogonal coordinate system having axes representing the engine rotational speed and the engine load respectively. In consequence, five of the lattice points that are equal in respective values of the engine rotational speed and the engine load to one another and different in the value of the engine coolant temperature from one another are associated with each one of the cores 102a. An optimal control value calculation program that uses adaptive data adapted to the engine rotational speed, the engine load and the engine coolant temperatures at the associated lattice points is allocated to each of the cores 102a. In combination with an interpolation calculation program, the optimal control value calculation program is installed in each of the local memories 106. The aforementioned respective adaptive, data are used as the values of parameters of an engine performance model that is employed by the optimal value calculation program. In the multicore processor 100 according to this embodiment of the invention, twenty-five of the cores 102a function as optimal value calculation cores for calculating control target values of the actuators, and the other cores 102 are in charge of the other processes needed for engine control.

Figure 13:
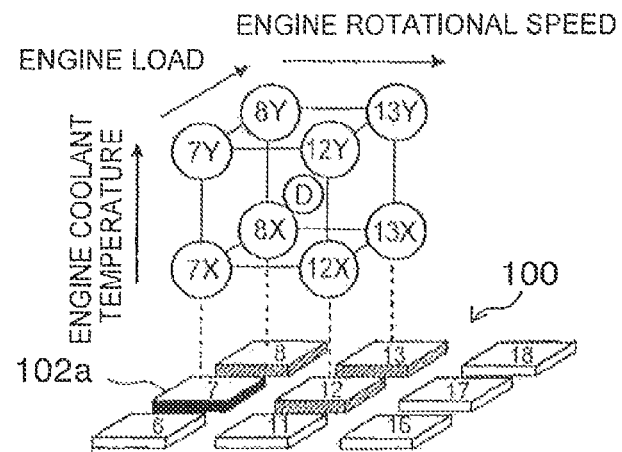
FIG. 13 is a view for explaining a method of calculating a control target value of each of actuators according to the third embodiment of the invention.

Next, a method of calculating control target values of the actuators through the use of the multicore processor 100 will be described using FIG. 13. In the three-dimensional orthogonal coordinate system shown in FIG. 13, a point D indicates an operating point that is determined by respective current values of the engine rotational speed, the engine load and the engine coolant temperature, namely, a current operating point. The current time as mentioned herein means a current time point at which a current time step is started. In order to appropriately control the engine, it is necessary to calculate optimal control values of the actuators at the current operating point, and set them as control target values of the actuators respectively. Thus, in this embodiment of the invention, optimal control values at the eight lattice points surrounding the current operating point are calculated, and an optimal control value at the current operating point is calculated through interpolation using those values. In an example shown in FIG. 13, the current operating point D belongs to a space that is defined by the lattice points #7X, #8X, #12X, #13X, #7Y, #8Y, #12Y and #13Y. In consequence, if the optimal control values at these lattice points are known, the optimal control value at the current operating point D can be obtained by being calculated through interpolation using those values.

The optimal control value at the current operating point D is specifically calculated according to the following procedure. First of all, in the arrangement of the cores shown in FIG. 13, the multicore processor 100 uses the cores 102a #7, #8, #12 and #13 corresponding to the aforementioned lattice points respectively for the calculation. Each of these cores 102a sequentially calculates optimal control values at the respective lattice points that are associated with each of the cores 102a itself, according to the optimal control value calculation program that is installed in the local memory 106 of each of the cores 102a itself. For example, the core 102a #7 calculates an optimal control value at the lattice point #7X, and subsequently calculates an optimal control value at the lattice point #7Y. The calculations of optimal control values by the four cores 102a are performed in parallel. If the optimal control value has been calculated in each of the cores 102a, data on a calculation result thereof are gathered on a representative one of the four cores. Each of the cores 102a is programmed to recognize, as the representative lattice point, that lattice point which is closest to the origin in the three-dimensional orthogonal coordinate system among the eight lattice points surrounding the current operating point, and to recognize, as a representative core, the core with which the representative lattice point is associated. In the example shown in FIG. 13, the core 102a #7 is the representative core. The core 102a #7 as the representative core calculates through interpolation an optimal control value at the current operating point D according to an interpolation calculation program that is installed in the local memory 106 of the core 102a #7 itself, using data on the optimal control values at the two lattice points calculated by the core 102a #7 itself and data on the optimal control values at the six lattice points received from the cores 102a #8, #12 and #13 respectively.

According to the method described above, the engine coolant temperature as the third operating condition is reflected on the control target values of the actuators, whereby finer engine control can be realized than in the first embodiment of the invention. Besides, the calculations of optimal control values at the eight lattice points as needed for the interpolation calculation are dispersedly performed by the four cores 102a that operate in parallel. Therefore, the time needed to calculate the control target values of the actuators can be drastically reduced in comparison with a case where the conventional single-core processor is employed. Furthermore, according to the method described above, the optimal control values at the eight lattice points are calculated by the four cores 102a that are physically closest to one another, and one of the four cores 102a functions as the interpolation calculation core. This makes it possible not only to reduce the difference in communication delay time that is created when the data on the optimal control values calculated by the respective cores are given to the interpolation calculation core, but also to shorten the communication delay time itself.

Figure 14:
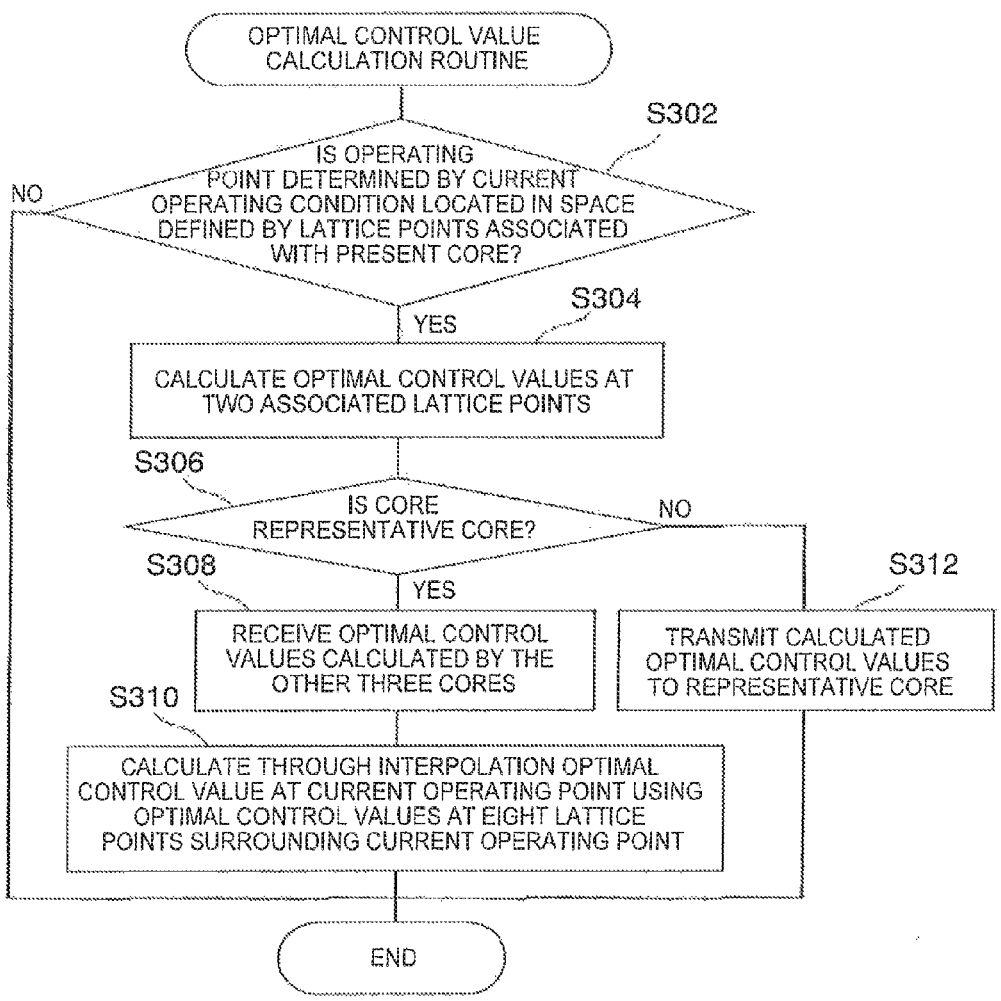
FIG. 14 is a flowchart showing an optimal control value calculation routine that is executed by each of the cores in the third embodiment of the invention.

Incidentally, the method described above is carried out through the execution of an optimal control value calculation routine shown in a flowchart of FIG. 14 in each of the cores 102a, This routine is executed at intervals of a certain time step (e.g., on a control cycle of the engine) for each of the cores 102a, through the application that is installed in a corresponding one of the local memories 106 of each of the cores 102a.

In step S302 as a first step of the flowchart of FIG. 14, the core 102a acquires respective current values of the engine rotational speed, the engine load and the engine coolant temperature. Those values are calculated on the basis of output values of sensors by the cores 102 other than the optimal control value calculation core. Subsequently, the core 102.a specifies a current operating point from the respective current values of the engine rotational speed, the engine load and the engine coolant temperature, and determines whether or not the current operating point is located in a space that is defined by any of the lattice points that are associated with the core 102a itself. For example, if the relevant core 102a is the core #7, the core 102a determines which one of a plurality of cubic spaces having the lattice point #7X and the lattice point #7Y as apices contains the current operating point.

If the result of the determination in step S302 is negative, the core 102a stops calculating an optimal control value, and ends the calculation in the current time step. This is because wasteful consumption of electric power should be curbed.

If the result of the determination in step S302 is positive, the core 102a performs a process of step S304. In step S304, the core 102a executes the optimal control value calculation program, and calculates optimal control values at the two lattice points associated with the current operating point among the lattice points associated with the core 102a itself.

Subsequently in step S306, the core 102a determines whether or not the core 102a itself ranks as the representative core. It can be determined whether or not the core 102a is the representative core, from a positional relationship between the lattice points that are associated with the core 102a itself and the current operating point.

If the result of the determination in step S306 is negative, the core 102a performs a process of step S312. In step S312, the core 102a transmits to the representative core data on the optimal control values at the two lattice points that are calculated by the core 102a itself. It can be determined which one of the cores ranks as the representative core, from a coordinate of the current operating point on the three-dimensional orthogonal coordinate system. Through the transmission of the data on the optimal control values, the calculation in the current time step by the relevant core 102a ends.

If the result of the determination in step S306 is positive, the core 102a performs a process of step S308. In step S308, the core 102a receives, from the respective cores with which the other lattice points defining the operation space to which the current operating point belongs are associated respectively, data on the optimal control values that are calculated by those cores respectively. For example, if the current operating point is located as indicated by the point D in FIG. 13 and the relevant core 102a is the core #7, the core 102a receives, from the respective cores 102a #8, #12 and #13, data on the optimal control values at the six lattice points that are calculated by those cores respectively.

Subsequently in step S310, the core 102a as the representative core calculates through interpolation an optimal control value at the current operating point according to the interpolation calculation program, on the basis of the optimal control values at the eight lattice points including the optimal control value that is calculated by the core 102a itself. The optimal control value at the current operating point, which is obtained by being calculated through interpolation, is output as a target value of each of the actuators. Thus, the calculation in the current time step by the relevant core 102a ends.

Through the execution of the foregoing routine in each of the cores 102a, the consumption of electric power can be curbed while making it possible to calculate a control target value of each of the actuators at a high speed.

Fourth Embodiment

Next, an engine control apparatus according to the fourth embodiment of the invention will be described with reference to the drawings.

The arrangement of the cores 102 in the multicore processor 100, the hardware architecture of the multicore processor 100, and the software architecture of the multicore processor 100 in this embodiment of the invention are identical to those of the first embodiment of the invention shown in FIGS. 1, 2 and 3. Besides, lattice points are arranged on a three-dimensional orthogonal coordinate system having axes representing an engine rotational speed, an engine load and an engine coolant temperature respectively according to the same method as in the third embodiment of the invention shown in FIG. 12, and those lattice points are associated with the cores 102 on the multicore processor 100 according to the same method as in the third embodiment of the invention shown in FIG. 12. This embodiment of the invention proposes a method of accurately calculating a control target value of each of the actuators in a situation where the operation state of the engine transiently changes, and the relationship between this embodiment of the invention and the third embodiment of the invention corresponds to the relationship between the second embodiment of the invention and the first embodiment of the invention.

Figure 15:
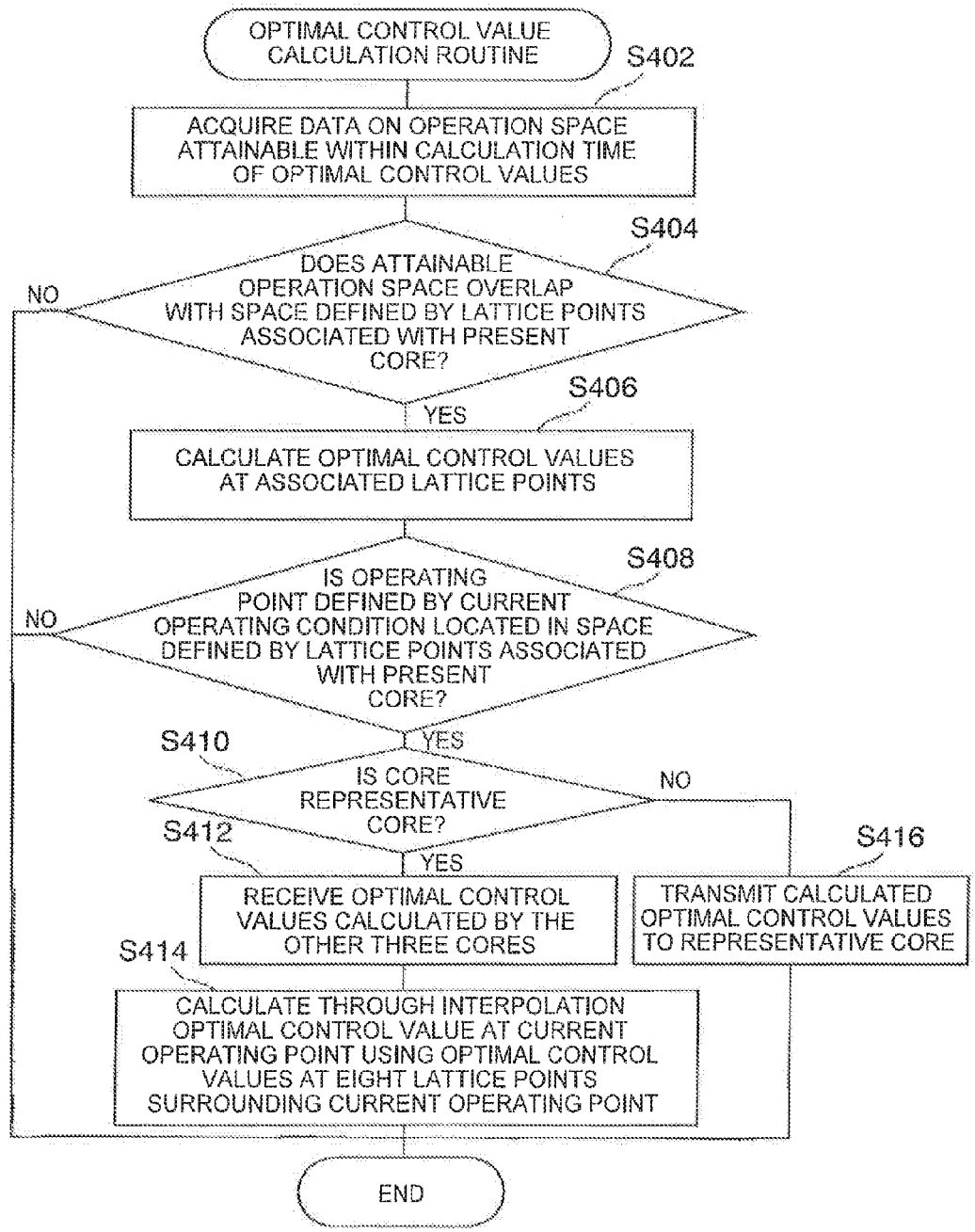
FIG. 15 is a flowchart showing an optimal control value calculation routine that is executed by each of the cores in the fourth embodiment of the invention.

The method of calculating a control target value of each of the actuators according to this embodiment of the invention is carried out through the execution of an optimal control value calculation routine shown in a flowchart of FIG. 15 in each of the cores 102a with which the lattice points are associated respectively. This routine is executed at intervals of a certain time step (e.g., on a control cycle of the engine) for each of the cores 102a, through the application that is installed in a corresponding one of the local memories 106 of each of the cores 102a.

In step S402 as a first step of the flowchart of FIG. 15, the core 102a acquires data on an operation space that can be attained within a calculation time of an optimal control value from the current time point. If it is assumed that the engine rotational speed, the engine load and the engine coolant temperature at a time point when the current time step is started are denoted by NEa (rpm), KLa (%) and TWa (° C.) respectively, the operation space is calculated as a range where the engine rotational speed is NEa±ΔNE (rpm), the engine load is KLa±ΔKL (%), and the engine coolant temperature is TWa+ΔTW (° C.). It should be noted herein that ΔNE denotes a maximum amount of change in engine rotational speed that is predicted within the calculation time of the optimal control value, that ΔKL denotes a maximum amount of change in engine load that is predicted within the calculation time of the optimal control value, and that ΔTW is a maximum amount of rise in engine coolant temperature that is predicted within the calculation time of the optimal control value. The operation space that can be attained is calculated by the cores 102 other than the optimal control value calculation core.

Subsequently in step S404, the core 102a determines whether or not the operation space acquired in step S402 overlaps with a space that is defined by any of the lattice points associated with the core 102a itself.

If the result of the determination in step S404 is negative, the core 102a stops calculating an optimal control value, and ends the calculation in this current time step. This is because wasteful consumption of electric power should be curbed.

If the result of the determination in step S404 is positive, the core 102a performs a process of step S406. In step S406, the core 102a executes the optimal control value calculation program, and calculates an optimal control value at each of the lattice points associated with the core 102a itself among the lattice points that define the operation space acquired in step S402.

Subsequently in step S408, the core 102a acquires respective current values of the engine rotational speed, the engine load and the engine coolant temperature. The current time as mentioned herein means a current time point at which the calculation of an optimal control value is completed. Then, the core 102a specifies the current operating point on the three-dimensional orthogonal coordinate system from the respective current values of those three operating conditions, and determines whether or not the current operating point is located in a space that is defined by any of the lattice points associated with the core 102a itself.

If the result of the determination in step S408 is negative, the core 102a nullifies the calculation result of the optimal control value, and ends the calculation in the current time step.

If the result of the determination in step S408 is positive, the core 102a performs a process of step S410. In step S410, the core 102a determines whether or not the core 102a itself ranks as the representative core. It can be determined whether or not the core 102a is the representative core, from a positional relationship between the lattice points that are associated with the core 102a itself and the current operating point.

If the result of the determination in step S410 is negative, the core 102a performs a process of step S416. In step S416, the core 102a transmits to the representative core data on the optimal control values at the two lattice points associated with the current operating point, among data on the optimal control values that are calculated in advance in step S404. It can be determined which one of the cores ranks as the representative core, from a coordinate of the current operating point on the three-dimensional orthogonal coordinate system. The calculation in the current time step by the relevant core 102a ends through the transmission of the data on the optimal control values.

If the result of the determination in step S410 is positive, the core 102a performs a process of step S412. In step S412, the core 102a receives, from the respective cores with which the other lattice points defining the operation space to which the current operating point belongs are associated respectively, data on the optimal control values at the six lattice points that are calculated by those cores respectively.

Subsequently in step S414, the core 102a as the representative core calculates through interpolation an optimal control value at the current operating point according to the interpolation calculation program, on the basis of the optimal control values at the eight lattice points including the optimal control value that is calculated by the core 102a itself. The optimal control value at the current operating point, which is obtained by being calculated through interpolation, is output as a control target value of each of the actuators. Thus, the calculation in the current time step by the relevant core 102a ends.

Through the execution of the foregoing routine in each of the cores 102a, the control target value of each of the actuators can be calculated without being delayed with respect to the control cycle of the engine while curbing the consumption of electric power even in a situation where the operation state of the engine transiently changes.

Fifth Embodiment

Next, an engine control apparatus according to the fifth embodiment of the invention will be described with reference to the drawings.

The arrangement of the cores 102 in the multicore processor 100, the hardware architecture of the multicore processor 100, and the software architecture of the multicore processor 100 according to this embodiment of the invention are identical to those of the first embodiment of the invention shown in FIGS. 1, 2 and 3. The method of calculating a control target value of each of the actuators according to this embodiment of the invention is premised on that according to the third embodiment of the invention. Accordingly, lattice points are arranged on a three-dimensional orthogonal coordinate system having axes representing an engine rotational speed, an engine load and an engine coolant temperature respectively according to the same method as in the third embodiment of the invention, and those lattice points are associated with the cores 102 on the multicore processor 100 respectively according to the same method as in the third embodiment of the invention.

The engine control apparatus according to this embodiment of the invention is characterized in that the third operating condition as one of the three operating conditions serving as a basis in determining a control target value of each of the actuators is changed in accordance with the state of the engine. In this embodiment of the invention as well, until the engine has been warmed up, the engine coolant temperature is used as the third operating condition as is the case, with the third embodiment of the invention. However, since the amount of change in engine coolant temperature is small after the engine has been warmed up, the movements of the operating point on the three-dimensional orthogonal coordinate system, which has the Z-axis representing the engine coolant temperature, are limited to those on a specific XY plane on which the engine coolant temperature is constant. That is, a large number of the lattice points that are arranged in the Z-axis direction are not used after the engine has been warmed up. Thus, in this embodiment of the invention, the third operating condition is changed from the engine coolant temperature to the intake air temperature upon the completion of the warm-up of the engine.

Figure 16:
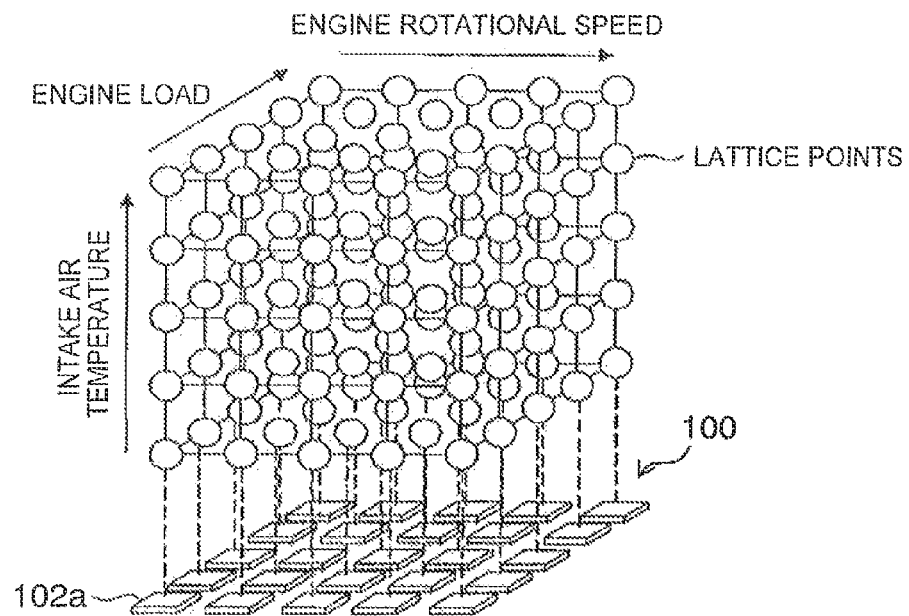
FIG. 16 is a view showing how a plurality of the lattice points arranged on the three-dimensional orthogonal coordinate system and a plurality of the cores on the multicore processor are associated with one another.

FIG. 16 shows the arrangement of the lattice points on a three-dimensional orthogonal coordinate system having the X-axis representing the engine rotational speed, the Y-axis representing the engine load, and the Z-axis representing the intake air temperature. A three-dimensional latticed pattern that is assumed by the lattice points on this three-dimensional orthogonal coordinate system is identical to that on the three-dimensional orthogonal coordinate, system having the Z-axis representing the engine coolant temperature as shown in FIG. 12. A plurality of the lattice points that are arranged on the three-dimensional orthogonal coordinate system having the Z-axis representing the intake air temperature are associated with the twenty-five cores 102a on the same line as on the two-dimensional orthogonal coordinate system having the axes representing the engine rotational speed and the engine load respectively. Adaptive data that are adapted to the engine rotational speed, the engine, load and the intake air temperature at each of the lattice points are associated therewith. The adaptive data at each of the lattice points are incorporated into the optimal control value calculation program, and are allocated to the core 102a with which the relevant lattice point is associated.

In this manner, in this embodiment of the invention, in addition to a plurality of lattice points (lattice points of a first group) that are equal in the respective values of the engine rotational speed and the engine load to one another and different in the value of the engine coolant temperature from one another, a plurality of lattice points (lattice points of a second group) that are equal in the respective values of the engine rotational speed and the engine load to one another and different in the value of the intake air temperature from one another are associated with each of the cores 102a. The optimal control value calculation program that is installed in the local memory 106 of each of the cores 102a is designed such that either adaptive data adapted to the respective lattice points of the first group or adaptive data adapted to the respective lattice points of the second group can be selectively used.

Figure 17:
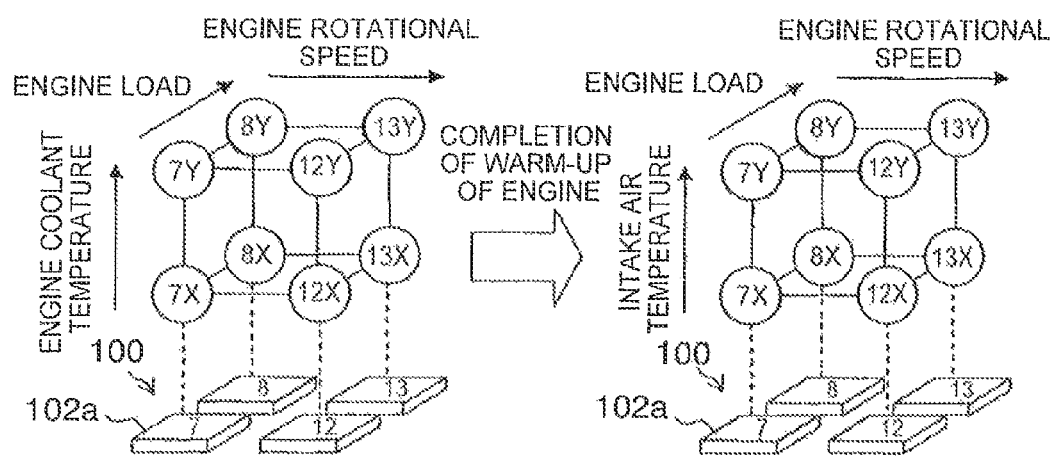
FIG. 17 is a view for explaining a method of calculating a control target value of each of actuators according to the fifth embodiment of the invention.

From the start of the engine to the completion of the warm-up of the engine, each of the cores 102a uses adaptive data adapted to the respective lattice points of the first group for the calculation according to the optimal control value calculation program as shown in the left diagram of FIG. 17. For example, if the current operating point is located at a position of a point E in the three-dimensional orthogonal coordinate system shown in the left diagram of FIG. 17, the core 102a #7 calculates optimal control values at the respective lattice points #7X and #7Y. The optimal control value at the point E is calculated through interpolation using the optimal control values at respective lattice points #7X, #7Y, #8X, #8Y, #12X, #12Y, #13X and #13Y.

When the warm-up of the engine is then completed, each of the cores 102a changes the adaptive data used for the calculation of an optimal control value to the adaptive data adapted to the respective lattice points of the second group as shown in the right diagram of FIG. 17. For example, if the current operating point after the change is located at a point F in a three-dimensional orthogonal coordinate system shown in the right diagram of FIG. 17, the core 102a #7 calculates optimal control values at respective lattice points 7x and 7y. The optimal control value at the point F is calculated through interpolation using optimal control values at the respective lattice points 7x and 7y and respective lattice points 8x, 8y, 12x, 12y, 13x and 13y.

Even if the engine has been warmed up, the intake air temperature changes. Thus, the intake air temperature has a greater influence on the state of the engine than the engine coolant temperature in a situation where warm-up has been completed. In consequence, by changing the third operating condition from the engine coolant temperature to the intake air temperature upon the completion of the warm-up of the engine, the state of the engine can be more appropriately controlled through effective use of the three-dimensional arrangement of the lattice points.

Others

The invention is not limited to the aforementioned embodiments thereof, but can be carried out after being modified in various manners without departing from the gist of the invention. For example, the invention may be carried out after being modified as follows.

Figure 18:
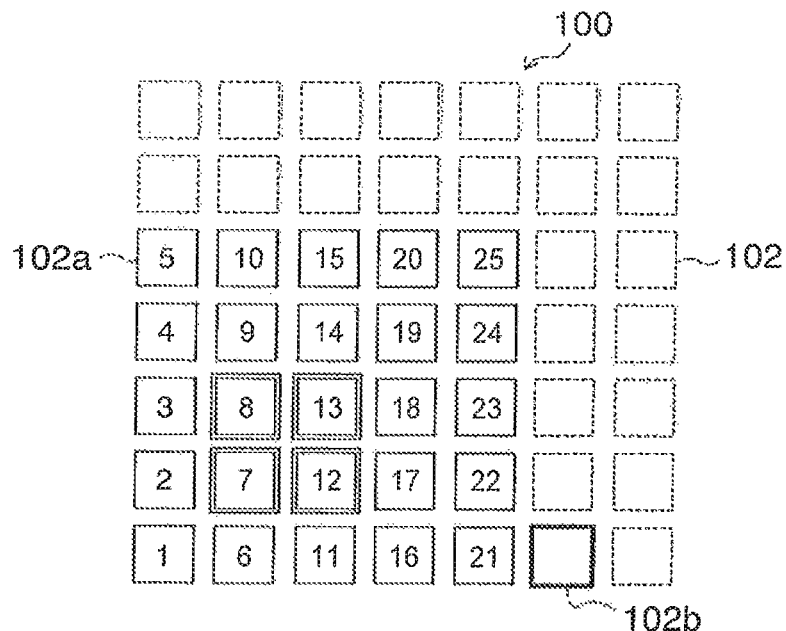
FIG. 18 is a view for explaining a method of calculating a control target value of each of actuators according to a first modification example of the first embodiment of the invention.
Figure 19:
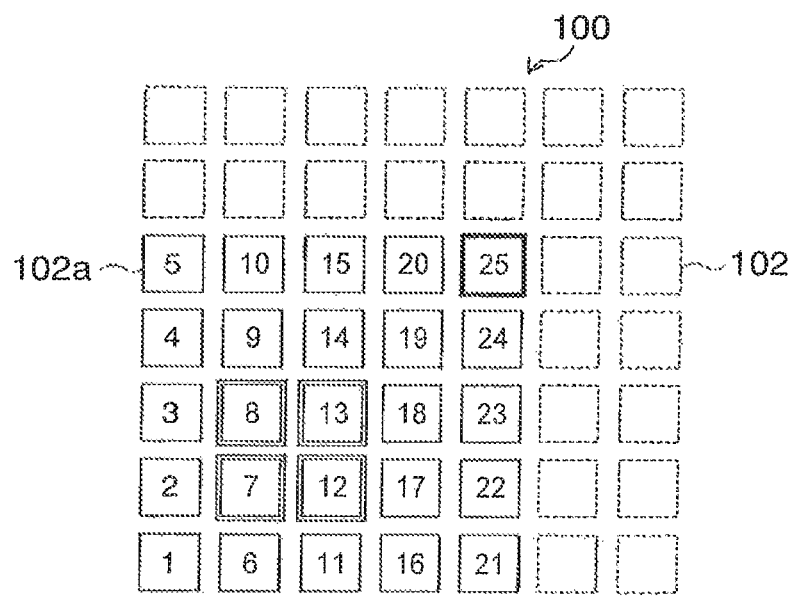
FIG. 19 is a view for explaining a method of calculating a control target value of each of actuators according to a second modification example of the first embodiment of the invention.

In each of the aforementioned embodiments of the invention, the interpolation calculation is performed in the representative core that is selected from the cores that have calculated the optimal control values. However, the interpolation calculation can also be performed in the other cores. For example, each of FIGS. 18 and 19 shows a modification example of the first embodiment of the invention. As indicated by the modification example of FIG. 18, any one of cores 102b other than the cores 102a with which the lattice points are associated respectively can be used as an interpolation calculation core. Alternatively, as indicated by the modification example of FIG. 19, any one of the cores 102a with which the lattice points are associated respectively can also be fixed as an interpolation calculation core. In that case, it is preferable that a core with an averagely low calculation load, such as the core 102a #25 with which the lattice point with the maximum engine rotational speed and the maximum engine load is associated, be used as an interpolation calculation core. In these modification examples, when the data on the optimal control values calculated by the respective cores are transmitted to the interpolation calculation core, the communication delay time increases as the physical distance therebetween increases. However, the calculation of the optimal control value that is used in the interpolation calculation is performed in a group of cores that are physically closest to one another, for example, a group of the cores 102a #7, #8, #12 and #13. Therefore, the difference in communication delay time among the cores is small. Because of the small difference in communication delay time, the calculation can be performed with high efficiency in the multicore processor as a whole.

In each of the aforementioned embodiments of the invention, the lattice points are associated with one or some of the cores that are mounted on the multicore processor. However, the lattice points can also be associated with all the cores that are mounted on the multicore processor. For example, in the case of the multicore processor 100 shown in FIG. 1, 49 lattice points may be arranged on a two-dimensional orthogonal coordinate system having axes representing an engine rotational speed and an engine load respectively, and may be associated with all the forty-nine cores 102 respectively. In that case, among the cores with which the lattice points are associated respectively, that core with an averagely relatively low load may take charge of the other processes needed for engine control. Incidentally, the number of cores mounted on the multicore processor may be preferably equal to or larger than four, and more preferably equal to or larger than nine. The number of cores is not specifically limited. Besides, the number of lattice points arranged on the two-dimensional orthogonal coordinate system is not specifically limited as long as it is equal to or smaller than the number of cores mounted on the multicore processor.

In the fourth embodiment of the invention, the third operating condition after the completion of the warm-up of the engine may be a vehicle speed instead of the intake air temperature. This is because a difference in vehicle speed leads to a difference in the intensity of traveling wind and thus to a difference in the temperature of an exhaust system. Moreover, any operating condition that continuously changes is preferable as the third operating condition. For example, an atmospheric pressure or an EGR rate is preferable as the third operating condition.

DESCRIPTION OF REFERENCE NUMERALS

100 MULTICORE PROCESSOR
102 CORE
102a CORE WITH WHICH LATTICE POINT IS ASSOCIATED
104 CPU
106 LOCAL MEMORY
108 BUS
110 OS
112 APPLICATION

The invention claimed is:

1. An engine control apparatus that calculates a control target value of one actuator or control target values of a plurality of actuators, comprising:
a multicore processor in which a plurality of cores are arranged in a latticed manner, wherein
a plurality of lattice points that are arranged on a two-dimensional orthogonal coordinate system having axes representing a first operating condition and a second operating condition respectively are associated with at least one or some of the plurality of the cores respectively on one-on-one level on a same line as on the two-dimensional orthogonal coordinate system, and a calculation program for calculating an optimal control value of the one actuator at the associated lattice points or calculation programs for calculating optimal control values of the plurality of the actuators at the associated lattice points are allocated to at least one or some of the plurality of the cores respectively,
each of the cores with which the lattice points are associated respectively is programmed, in a case where an operation area on the two-dimensional orthogonal coordinate system to which a current operating point belongs is an area that is defined by the lattice point associated with each of the cores itself, to transmit to an interpolation calculation core an optimal control value at the relevant lattice point that is calculated by each of the cores itself,
the interpolation calculation core is programmed to perform an interpolation calculation of an optimal control value at the operating point using optimal control values at all the lattice points that define the operation area, and
the multicore processor outputs the optimal control value at the operating point, which is obtained through the interpolation calculation, as the control target value.

2. The engine control apparatus according to claim 1, wherein
each of the cores with which the lattice points are associated respectively is programmed to function as the interpolation calculation core in a case where the operation area on the two-dimensional orthogonal coordinate system to which the current operating point belongs is an area that is defined by the lattice points associated with each of the cores itself, and where each of the cores itself is associated with a representative lattice point among the plurality of the lattice points that define the operation area.

3. The engine control apparatus according to claim 1, wherein
each of the cores with which the lattice points are associated respectively is programmed, in a case where the operation area on the two-dimensional orthogonal coordinate system to which the current operating point belongs is an area that is defined by the lattice points associated with each of the cores itself, to calculate optimal control values at the relevant lattice points according to the calculation program, and in a case where the operation area is not an area that is defined by the lattice points associated with each of the cores itself, to stop calculating optimal control values at the relevant lattice points.

4. The engine control apparatus according to claim 1, wherein
each of the cores with which the lattice points are associated respectively is programmed, in a case where an operation area that can be attained within a calculation time of optimal control values overlaps with an area that is defined by the lattice points associated with each of the cores itself, to calculate optimal control values at the relevant lattice points according to the calculation program, and in a case where the operation area does not overlap with the area that is defined by the lattice points associated with each of the cores itself, to stop calculating optimal control values at the relevant lattice points.

5. The engine control apparatus according to claim 1, wherein
the first operating condition and the second operating condition are an engine rotational speed and an engine load respectively.

6. The engine control apparatus according to claim 2, wherein
each of the plurality of the cores is equipped with a CPU and a local memory in which a program that is executed in the CPU is stored, and
the calculation program and an interpolation calculation program that is executed in a case where the relevant core becomes the interpolation calculation core are stored in the local memory.

7. An engine control apparatus that calculates a control target value of one actuator or control target values of a plurality of actuators through use of a multicore processor, comprising:
the multicore processor in which a plurality of cores are arranged in a latticed manner, wherein
a plurality of lattice points that are arranged on a three-dimensional orthogonal coordinate system having axes representing a first operating condition, a second operating condition and a third operating condition respectively are associated with at least one or some of the plurality of the cores respectively on a same line as on a two-dimensional orthogonal coordinate system having axes representing the first operating condition and the second operating condition respectively, and a calculation program for calculating an optimal control value of the one actuator at each of the associated lattice points or calculation programs for calculating optimal control values of the plurality of the actuators at each of the lattice points are allocated to at least one or some of the plurality of the cores respectively,
each of the cores with which the lattice points are associated is programmed, in a case where an operation space on the three-dimensional orthogonal coordinate system to which a current operating point belongs is a space that is defined by any of the plurality of the lattice points that are associated with each of the cores itself and are equal in respective values of the first operating condition and the second operating condition to one another and different in a value of the third operating condition from one another, to transmit, to an interpolation calculation core, optimal control values calculated by each of the cores itself at two of the lattice points that define the operation space,
the interpolation calculation core is programmed to perform an interpolation calculation of an optimal control value at the operating point using optimal control values at all the lattice points that define the operation space, and
the multicore processor outputs the optimal control value at the operating point, which is obtained through the interpolation calculation, as the control target value.

8. The engine control apparatus according to claim 7, wherein
each of the cores with which the lattice points are associated respectively is programmed to function as the interpolation calculation core in a case where an operation area on the two-dimensional orthogonal coordinate system to which the current operating point belongs is an area that is defined by the lattice points associated with each of the cores itself, and where each of the cores itself is associated with a representative lattice point among the plurality of the lattice points that define the operation area.

9. The engine control apparatus according to claim 7, wherein
each of the cores with which the lattice points are associated respectively is programmed, in a case where the operation space on the three-dimensional orthogonal coordinate system to which the current operating point belongs is a space that is defined by any of the lattice points associated with each of the cores itself, to calculate optimal control values at the lattice points associated with each of the cores itself among the lattice points that define the operation space according to the calculation program, and in a case where the operation space is not a space that is defined by the lattice points associated with each of the cores itself, to stop calculating optimal control values at all the lattice points associated with each of the cores itself.

10. The engine control apparatus according to claim 7, wherein
each of the cores with which the lattice points are associated respectively is programmed, in a case where an operation space that can be attained within a calculation time of optimal control values overlaps with a space that is defined by any of the lattice points associated with each of the cores itself, to calculate optimal control values at the lattice points associated with each of the cores itself among the lattice points that define the space that overlaps with the operation space, according to the calculation program, and in a case where the operation space does not overlap with the space that is defined by any of the lattice points associated with each of the cores itself, to stop calculating optimal control values at all the lattice points associated with each of the cores itself.

11. The engine control apparatus according to claim 7, wherein
the first operating condition and the second operating condition are an engine rotational speed and an engine load respectively.

12. The engine control apparatus according to claim 11, wherein
the third operating condition is an engine coolant temperature.

13. The engine control apparatus according to claim 11, wherein
the third operating condition is a vehicle speed or an intake air temperature.

14. The engine control apparatus according to claim 11, wherein
each of the plurality of the cores is programmed to select an operating condition that should be the third operating condition from a plurality of operating conditions defined in advance, in accordance with an operation state of an engine.

15. The engine control apparatus according to claim 14, wherein
each of the plurality of the cores is programmed to calculate optimal control values using an engine coolant temperature as the third operating condition while the engine is warmed up, and to calculate optimal control values after changing the third operating condition to a vehicle speed or an intake air temperature after the engine has been warmed up.

16. The engine control apparatus according to claim 8, wherein
each of the plurality of the cores is equipped with a CPU and a local memory in which a program that is executed in the CPU is stored, and
the calculation program and an interpolation calculation program that is executed in a case where the relevant core becomes the interpolation calculation core are stored in the local memory.

\* \* \* \* \*